(12) United States Patent
Imai et al.

(10) Patent No.: US 12,253,766 B2
(45) Date of Patent: Mar. 18, 2025

(54) LIQUID CRYSTAL DISPLAY DEVICE

(71) Applicant: Sharp Display Technology Corporation, Kameyama (JP)

(72) Inventors: Masahiro Imai, Kameyama (JP); Yasuyoshi Kaise, Kameyama (JP); Takahiro Yamaguchi, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/611,957

(22) Filed: Mar. 21, 2024

(65) Prior Publication Data
US 2024/0402544 A1     Dec. 5, 2024

(30) Foreign Application Priority Data
May 31, 2023   (JP) .................................. 2023-089492

(51) Int. Cl.
| G02F 1/1335 | (2006.01) |
| G02F 1/133 | (2006.01) |
| G02F 1/1343 | (2006.01) |
| G02F 1/1362 | (2006.01) |
| G02F 1/1368 | (2006.01) |

(52) U.S. Cl.
CPC .... *G02F 1/134345* (2021.01); *G02F 1/13306* (2013.01); *G02F 1/136209* (2013.01); *G02F 1/136295* (2021.01); *G02F 1/1368* (2013.01)

(58) Field of Classification Search
CPC .................................................... G02F 1/1343
See application file for complete search history.

(56) References Cited

U.S. PATENT DOCUMENTS

| 2007/0195239 A1* | 8/2007 | Lee | G02F 1/136227 349/114 |
| 2009/0219476 A1* | 9/2009 | Tasaka | G02F 1/134336 349/187 |
| 2009/0309813 A1* | 12/2009 | Fujita | G09G 3/3611 345/55 |
| 2011/0242078 A1* | 10/2011 | Takahashi | G09G 3/3611 345/211 |
| 2013/0300965 A1* | 11/2013 | Nonaka | G02F 1/133514 349/42 |
| 2019/0088191 A1* | 3/2019 | Shin | G02F 1/1333 |
| 2019/0198579 A1* | 6/2019 | Park | H10K 50/865 |
| 2023/0244097 A1* | 8/2023 | Yamaguchi | G09G 3/36 349/37 |
| 2024/0053644 A1* | 2/2024 | Yoshida | G02F 1/136286 |

FOREIGN PATENT DOCUMENTS

| CN | 105911744 | * 10/2020 | ........... G02F 1/1335 |
| JP | 2006-276580 A | 10/2006 | |
| JP | 2006276580 | * 10/2006 | ........... G02F 1/1335 |
| JP | 2009-300556 A | 12/2009 | |

* cited by examiner

*Primary Examiner* — Sang V Nguyen
(74) *Attorney, Agent, or Firm* — ScienBiziP, P.C.

(57) ABSTRACT

A plurality of pixel electrodes each forming one pixel are provided on a TFT substrate. A size of a pixel electrode located at a boundary portion between a non-rectangular active area and a frame region, which is an area outside the active area, is smaller than a size of a pixel electrode not located at the boundary portion. In such a configuration, a voltage is always applied to the plurality of pixel electrodes.

20 Claims, 40 Drawing Sheets

LIQUID CRYSTAL DISPLAY DEVICE

CROSS-REFERENCE TO RELATED APPLICATIONS

This application claims the benefit of priority to Japanese Patent Application Number 2023-089492 filed on May 31, 2023. The entire contents of the above-identified application are hereby incorporated by reference.

BACKGROUND

Technical Field

The disclosure described below relates to a liquid crystal display device including a non-rectangular display region.

A liquid crystal display device generally includes a liquid crystal panel composed of two insulating glass substrates facing each other. One of the glass substrates is called a "TFT substrate", for example, and the other glass substrate is called a "counter substrate", for example. A thin film transistor (TFT), a pixel electrode, and the like are formed on the TFT substrate, and a common electrode (an electrode for applying a voltage between the common electrode and the pixel electrode), a color filter, and the like are formed on the counter substrate. Such a known general liquid crystal panel includes a rectangular display region. A plurality of source bus lines (image signal lines), a plurality of gate bus lines (scanning signal lines), and a plurality of pixel forming portions provided corresponding to respective intersections between the plurality of source bus lines and the plurality of gate bus lines are formed in the display region. Each of the pixel forming portions includes a TFT in which the gate bus line passing through the corresponding intersection is connected to a gate electrode and the source bus line passing through the corresponding intersection is connected to a source electrode, the pixel electrode connected to a drain electrode of the TFT, the common electrode and an auxiliary capacitance electrode commonly provided for the above-described plurality of pixel forming portion, a liquid crystal capacitance formed by the pixel electrode and the common electrode, and an auxiliary capacitance formed by the pixel electrode and the auxiliary capacitance electrode. A pixel capacitance is configured by the liquid crystal capacitance and the auxiliary capacitance. In the configuration described above, when the gate electrode of each of the TFTs receives an active scanning signal from the gate bus line, the pixel capacitance is charged based on a data signal received by the source electrode of the TFT from the source bus line. By charging the pixel capacitance in the plurality of pixel forming portions in this manner, a desired image is displayed in the rectangular display region. Hereinafter, the liquid crystal display device having the above-described configuration is referred to as a "TFT-LCD".

As described above, the known general liquid crystal display device includes the rectangular display region. However, in recent years, the number of liquid crystal display devices including a display region having a shape other than a rectangular shape, such as liquid crystal display devices for watches and liquid crystal display devices for in-vehicle use, has gradually increased. This type of display device is called a "non-standard shape display".

Disclosures relating to non-standard shape displays are disclosed in, for example, JP 2009-300556 A, and JP 2006-276580 A. In a liquid crystal display device disclosed in JP 2009-300556 A, with respect to a picture element located at an end portion of the display region, aperture ratios of effective display regions of R, G, and B included in the single picture element are set to be the same. In this way, the occurrence of a phenomenon is prevented in which color balance is lost and coloring occurs at the end portion of the display region. In a liquid crystal display device disclosed in JP 2006-276580 A, the display region is formed in a substantially elliptical shape or circular shape, and a color filter layer is formed in substantially the same shape as the display region. In this regard, more specifically, the color filter layer is formed in substantially the same shape as the display region by blocking a portion of the color filter layer protruding from the display region using a light blocking member. With such a configuration, the occurrence of display unevenness at the end portion of the display region is suppressed.

SUMMARY

Incidentally, with respect to a case in which it is attempted to realize a non-standard shape display performing low resolution display, when a configuration is adopted in which a pixel electrode straddling a display region and a frame region is not provided, a defective region in which an image is not displayed becomes large in the display region. As a result, the display becomes insufficient. On the other hand, when a configuration is adopted in which the pixel electrode is provided straddling the display region and the frame region, of the region in which the pixel electrode is formed, a region protruding into the frame region becomes large. It is therefore necessary to make the frame region larger. However, in recent years, there has been a strong demand for frame narrowing in order to realize a smaller display device. Thus, it is not preferable to make the frame region larger.

The liquid crystal display devices disclosed in JP 2009-300556 A, and JP 2006-276580 A are TFT-LCDs. In the TFT-LCD, a voltage is held between the pixel electrode and the common electrode during a period in which the TFT in the pixel forming portion is maintained in an off state, and no voltage is applied to the pixel electrode from the outside of the pixel forming portion. Here, when the TFT in the pixel forming portion changes from an on state to the off state, the voltage of the pixel electrode changes in accordance with a pixel capacitance ratio (a ratio of the pixel capacitance with respect to a total capacitance formed by the pixel electrode and other electrodes) (a feed-through voltage corresponding to the pixel capacitance ratio occurs). In this regard, when a pixel size (a size of the pixel electrode) is made smaller than a normal pixel size only in the boundary portion between the display region and the frame region, the pixel capacitance ratio in the boundary portion is different from the pixel capacitance ratio in a portion other than the boundary portion. Thus, a magnitude of the feed-through voltage differs between the boundary portion and the portion other than the boundary portion. As a result, for example, when display at constant luminance is to be performed, a display at different luminance is performed between in the boundary portion and in the portion other than the boundary portion. In other words, a display quality deteriorates. Further, when the magnitude of the feed-through voltage is different between the boundary portion and the portion other than the boundary portion, a voltage difference between the positive polarity and the negative polarity is generated, and there is a concern that there may be deterioration of the liquid crystal due to the voltage difference, that is, that there may be a decrease in reliability.

In view of the above-described circumstances, the following disclosure relates to a liquid crystal display device including a non-rectangular display region, and an object of the disclosure is to realize frame narrowing without causing a deterioration in display quality and reliability.

(1) A liquid crystal display device according to several embodiments of the disclosure is a liquid crystal display device including a display region having a non-rectangular shape. The liquid crystal display device includes a first substrate including a plurality of pixel electrodes each forming one pixel, a second substrate including a common electrode provided facing the plurality of pixel electrodes, and a liquid crystal provided between the plurality of pixel electrodes and the common electrode. A voltage is always applied to the plurality of pixel electrodes, and among the plurality of pixel electrodes, a size of a pixel electrode located at a boundary portion between the display region and a frame region is smaller than a size of a pixel electrode not located at the boundary portion, the frame region being a region outside the display region.

(2) The liquid crystal display device according to several embodiments of the disclosure includes the configuration according to (1) above, and the pixel electrode located at the boundary portion has a shape obtained by removing a portion included in the frame region from a shape of a normal pixel electrode, the pixel electrode being entirely included in the display region.

(3) The liquid crystal display device according to several embodiments of the disclosure includes the configuration according to (1) above, and a light blocking film is provided on the second substrate at least at or near the boundary portion in the frame region. At least some of the pixel electrodes located at the boundary portion include a portion included in the display region and a portion included in a region, of the frame region, where the light blocking film is provided.

(4) The liquid crystal display device according to several embodiments of the disclosure includes the configuration according to (3) above, and an outer edge of the display region forms an arc, in a region where the at least some of the pixel electrodes located at the boundary portion are provided. Each of the at least some of the pixel electrodes located at the boundary portion has a shape of an N-sided polygon having one side being a tangent line of the arc, where N is an integer in a range from 3 to 5.

(5) The liquid crystal display device according to several embodiments of the disclosure includes the configuration according to (3) above, and, of each of the pixel electrodes located at the boundary portion, a portion included in the frame region has a stepped shape in a plan view.

(6) The liquid crystal display device according to several embodiments of the disclosure includes the configuration according to (1) above, and the first substrate further includes a plurality of pixel transistors having a one-to-one correspondence with the plurality of pixel electrodes, a plurality of wiring electrodes each configured to connect a respective one of the plurality of pixel electrodes and a respective one of the plurality of pixel transistors, a drive circuit configured to drive the plurality of pixel transistors and provided in the frame region, and a polarity switching circuit configured to switch, at a predetermined interval, a polarity of a voltage applied to the plurality of pixel electrodes, the polarity switching circuit being provided in the frame region and including the plurality of pixel transistors. The drive circuit includes a shift register constituted by a plurality of unit circuits connected in series, and the plurality of unit circuits output, as a plurality of timing signals, a plurality of output signals becoming sequentially active. Capturing of a plurality of data signals is performed based on the plurality of timing signals. The drive circuit includes M latch circuits for each one of the plurality of timing signals, where M is an integer of 2 or more. The M latch circuits capture M data signals among the plurality of data signals based on corresponding timing signals among the plurality of timing signals, and output the M data signals captured. The polarity switching circuit is constituted by a plurality of polarity control units respectively corresponding to the plurality of wiring electrodes, and each of the plurality of polarity control units includes a first pixel transistor and a second pixel transistor, an on/off state of the first pixel transistor and the second pixel transistor changing in a mutually inverted manner based on a data signal among the plurality of data signals output from a corresponding latch circuit among the M latch circuits. A first voltage and a second voltage are applied to each of the plurality of polarity control units, a voltage level of the first voltage and the second voltage changing in a mutually inverted manner between a first level and a second level at the predetermined interval. When the first pixel transistor is in an on state, the first voltage is applied to a corresponding pixel electrode among the plurality of the pixel electrodes via a corresponding wiring electrode among the plurality of the wiring electrodes, and when the second pixel transistor is in an on state, the second voltage is applied to the corresponding pixel electrode via the corresponding wiring electrode.

(7) The liquid crystal display device according to several embodiments of the disclosure includes any one of the configurations according to (1) to (6) above, and the display region has a circular shape.

(8) A liquid crystal display device according to several embodiments of the disclosure is a liquid crystal display device including a display region having a non-rectangular shape. The liquid crystal display device includes a first substrate including a plurality of subpixel electrodes having a same size, a second substrate including a common electrode provided facing the plurality of subpixel electrodes, and a liquid crystal provided between the plurality of subpixel electrodes and the common electrode. In a boundary portion between the display region and a frame region being a region outside the display region, each of pixels is formed by one subpixel electrode among the plurality of subpixel electrodes or by two or more and K or fewer subpixel electrodes electrically connected to each other among the plurality of subpixel electrodes, and in a region, of the display region, other than the boundary portion, each of the pixels is formed by K subpixel electrodes electrically connected to each other among the plurality of subpixel electrodes, where K is an integer of 2 or more. Among the plurality of subpixel electrodes, only a subpixel electrode including at least a portion included in the display region is provided on the first substrate, and a subpixel electrode entirely included in the frame region is not provided on the first substrate.

(9) The liquid crystal display device according to several embodiments of the disclosure includes the configuration according to (8) above, and the first substrate further includes one or more connection electrodes configured to electrically connect, to each other, K or fewer subpixel electrodes forming each of the pixels among the plurality of subpixel electrodes, an insulating film formed between the plurality of subpixel electrodes and the one or more connection electrodes, and a contact hole formed penetrating the insulating film to electrically connect each of the plurality of subpixel electrodes and a corresponding connection electrode among the one or more connection electrodes.

(10) The liquid crystal display device according to several embodiments of the disclosure includes the configuration according to (9) above, and the first substrate further includes a plurality of wiring electrodes formed in a same layer as the one or more connection electrodes. A voltage corresponding to a data signal is applied to one of the K or fewer subpixel electrodes forming each of the pixels, via a corresponding wiring electrode among the plurality of wiring electrodes.

(11) The liquid crystal display device according to several embodiments of the disclosure includes the configuration according to (10) above, and the plurality of subpixel electrodes and the plurality of wiring electrodes are formed by a transparent conductive material.

(12) The liquid crystal display device according to several embodiments of the disclosure includes the configuration according to (9) above, and each of the plurality of subpixel electrodes has a rectangular shape. Each of four vertices of each of the plurality of subpixel electrodes is electrically connected to the corresponding connection electrode, via the contact hole.

(13) The liquid crystal display device according to several embodiments of the disclosure includes the configuration according to (8) above, and one or more connection electrodes are provided, the common electrode and each of the one or more connection electrodes facing each other over an entire gap portion between two subpixel electrodes adjacent to each other among the plurality of subpixel electrodes.

(14) The liquid crystal display device according to several embodiments of the disclosure includes the configuration according to (13) above, and the first substrate further includes a plurality of wiring electrodes formed in a separate layer from the one or more connection electrodes. A voltage corresponding to a data signal is applied to one of K or fewer subpixel electrodes forming each of the pixels among the plurality of subpixel electrodes, via a corresponding wiring electrode among the plurality of wiring electrodes.

(15) The liquid crystal display device according to several embodiments of the disclosure includes the configuration according to (13) above, and the plurality of subpixel electrodes and the one or more connection electrodes are formed by a transparent conductive material.

(16) The liquid crystal display device according to several embodiments of the disclosure includes the configuration according to (8) above, and one or more connection electrodes are provided, the common electrode and each of the one or more connection electrodes facing each other over an entire gap portion between two subpixel electrodes adjacent to each other among the plurality of subpixel electrodes and over an entire gap portion between two of the pixels adjacent to each other.

(17) The liquid crystal display device according to several embodiments of the disclosure includes the configuration according to (8) above, and, of K subpixel electrodes obtained by dividing pixel electrodes forming each of the pixels among the plurality of the subpixel electrodes, all subpixel electrodes including at least a portion included in the display region are provided on the first substrate.

(18) The liquid crystal display device according to several embodiments of the disclosure includes the configuration according to (8) above, and, of K subpixel electrodes obtained by dividing pixel electrodes forming each of the pixels among the plurality of subpixel electrodes, only a subpixel electrode including a portion having a predetermined area or greater included in the display region is provided on the first substrate.

(19) The liquid crystal display device according to several embodiments of the disclosure includes the configuration according to (8) above, and the first substrate further includes a plurality of pixel transistors having a one-to-one correspondence with a plurality of the pixels formed by the plurality of subpixel electrodes, a plurality of wiring electrodes each configured to connect a respective one of the plurality of pixels and a respective one of the plurality of pixel transistors, a drive circuit configured to drive the plurality of pixel transistors and provided in the frame region, and a polarity switching circuit configured to switch, at a predetermined interval, a polarity of a voltage applied to the plurality of subpixel electrodes, the polarity switching circuit being provided in the frame region and including the plurality of pixel transistors. The drive circuit includes a shift register constituted by a plurality of unit circuits connected in series. The plurality of unit circuits output, as a plurality of timing signals, a plurality of output signals becoming sequentially active, and capturing of a plurality of data signals is performed based on the plurality of timing signals. The drive circuit includes M latch circuits for each one of the plurality of timing signals, where M is an integer of 2 or more. The M latch circuits capture M data signals among the plurality of data signals based on corresponding timing signals among the plurality of timing signals, and output the M data signals captured. The polarity switching circuit is constituted by a plurality of polarity control units respectively corresponding to the plurality of wiring electrodes, and each of the plurality of polarity control units includes a first pixel transistor and a second pixel transistor, an on/off state of the first pixel transistor and the second pixel transistor changing in a mutually inverted manner based on a data signal among the plurality of data signals output from a corresponding latch circuit among the M latch circuits. A first voltage and a second voltage are applied to each of the plurality of polarity control units, a voltage level of the first voltage and the second voltage changing in a mutually inverted manner between a first level and a second level at the predetermined interval. When the first pixel transistor is in an on state, the first voltage is applied to a corresponding subpixel electrode among the plurality of subpixel electrodes via a corresponding wiring electrode among the plurality of wiring electrodes, and when the second pixel transistor is in an on state, the second voltage is applied to the corresponding subpixel electrode via the corresponding wiring electrode.

(20) The liquid crystal display device according to several embodiments of the disclosure includes any one of the configurations according to (8) to (19) above, and the display region has a circular shape.

In the liquid crystal display device according to the several embodiments of the disclosure, the display region has the non-rectangular shape, and the size of the pixel electrode located at the boundary portion between the display region and the frame region is smaller than the size of the pixel electrode not located at the boundary portion. With such a configuration, since a region protruding into the frame region, of the region in which the pixel electrodes are formed is smaller than that in the related art, the frame region can be narrowed. Further, in such a configuration, the voltage is always applied to all the pixel electrodes. Therefore, a luminance difference and a deterioration of the liquid crystal due to a difference in the magnitude of a feed-through voltage between the boundary portion and the portion other than the boundary portion do not occur. As described above, in the liquid crystal display device including the non-rectangular display region, the frame narrowing is realized without causing a deterioration in the display quality and reliability.

Further, in the liquid crystal display device according to several other embodiments of the disclosure, the pixel electrode forming the pixel is divided into the plurality of subpixel electrodes electrically connected to each other. Only the subpixel electrode having at least a portion included in the display region is provided on the first substrate, and the subpixel electrode entirely included in the frame region is not provided on the first substrate. According to such a configuration, since the region protruding into the frame region, of the region in which the pixel electrodes forming the pixel are provided, is smaller than that in the related art, the frame region can be narrowed. Further, since all the subpixel electrodes provided on the first substrate have the same size, a luminance difference, due to a difference in the magnitude of the feed-through voltage between the subpixels, does not occur. As described above, in the liquid crystal display device including the non-rectangular display region, the frame narrowing is realized without causing a deterioration in the display quality and reliability.

BRIEF DESCRIPTION OF DRAWINGS

The disclosure will be described with reference to the accompanying drawings, wherein like numbers reference like elements.

DESCRIPTION OF EMBODIMENTS

Embodiments will be described below with reference to the accompanying drawings. Note that, for second to fifth embodiments, a description of points that are the same as those of the first embodiment will be omitted.

1. First Embodiment 1.1 Outline of Liquid Crystal Display Device

Figure 2:
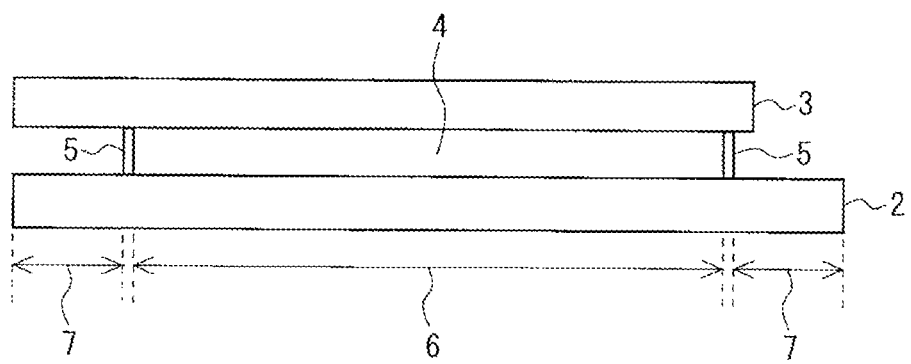
FIG. 2 is a schematic side view of a liquid crystal display device (a liquid crystal panel) according to the first embodiment.

FIG. 2 is a schematic side view of a liquid crystal display device (a liquid crystal panel) according to the first embodiment. This liquid crystal display device is configured by a TFT substrate (an array substrate) 2 and a counter substrate 3 that are two glass substrates provided facing each other with a liquid crystal 4 interposed therebetween. The TFT substrate 2 and the counter substrate 3 are bonded together by a sealing member 5, for example. A region denoted by a reference sign 6 corresponds to an active area (the display region) in which an image is actually displayed. A region denoted by a reference sign 7 corresponds to the frame region. Pixel electrodes and the like are formed on the TFT substrate 2, and a common electrode is formed on the counter substrate 3 so as to face the pixel electrodes. The common electrode is one electrode that is commonly used by all the pixels, and a common electrode drive signal, whose voltage level changes between a high level and a low level at a predetermined interval, is provided to the common electrode in order to suppress deterioration of the liquid crystal 4. Note that a first substrate is realized by the TFT substrate 2, and a second substrate is realized by the counter substrate 3.

Figure 3:
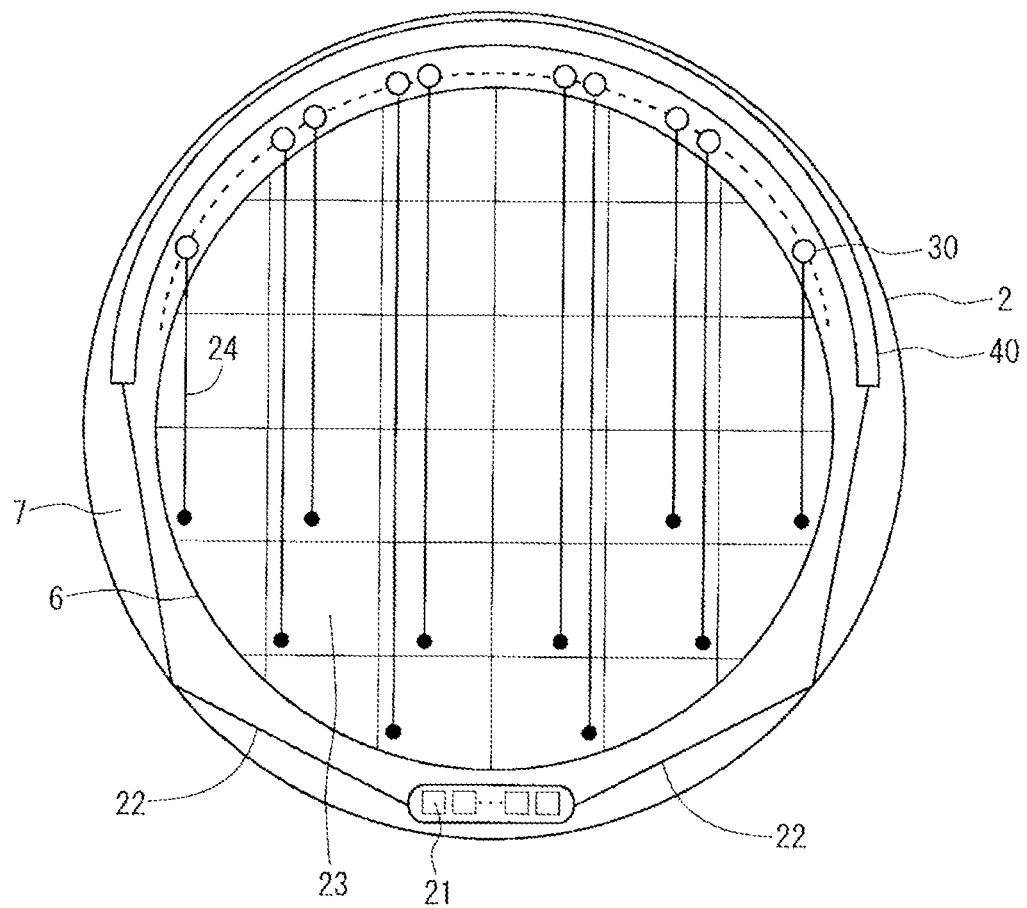
FIG. 3 is a diagram for describing constituent elements provided on a TFT substrate, according to the first embodiment.

FIG. 3 is a diagram for describing constituent elements provided on the TFT substrate 2. As understood from FIG. 3, the TFT substrate 2 and the active area 6 have a circular shape. In FIG. 3, the reference sign 6 is attached to an outer edge portion of the region in which the image is actually displayed in the active area (the same applies to FIG. 1 and the like). The active area 6 is divided into a plurality of unit display areas, and a plurality of pixel electrodes 23 are formed on the TFT substrate 2 so as to correspond to the plurality of unit display areas in a one to-one correspondence. Each of the plurality of pixel electrodes 23 forms one pixel. A plurality of input pads 21, a drive circuit 40, a plurality of pixel transistors 30, and a signal wiring line group 22 for transmitting a drive signal group applied to the plurality of input pads 21 to the drive circuit 40 are formed in a frame region (a region outside the active area 6) 7 on the TFT substrate 2. Further, in the active area 6, a plurality of wiring electrodes 24 are formed to electrically connect the plurality of pixel transistors 30 and the plurality of pixel electrodes 23 in a one to-one correspondence. Since the plurality of wiring electrodes 24 are formed in this manner, the pixels in the active area 6 are individually driven. Note that the configuration illustrated in FIG. 3 is an example, and the configuration is not limited thereto. For example, according to the configuration illustrated in FIG. 3, the drive circuit 40 is provided in the frame region 7, and the pixel transistors 30 are provided in a region between the drive circuit 40 and the active area 6 in the frame region 7, but the configuration is not limited thereto.

1.2 Details of Pixel Electrode

Figure 1:
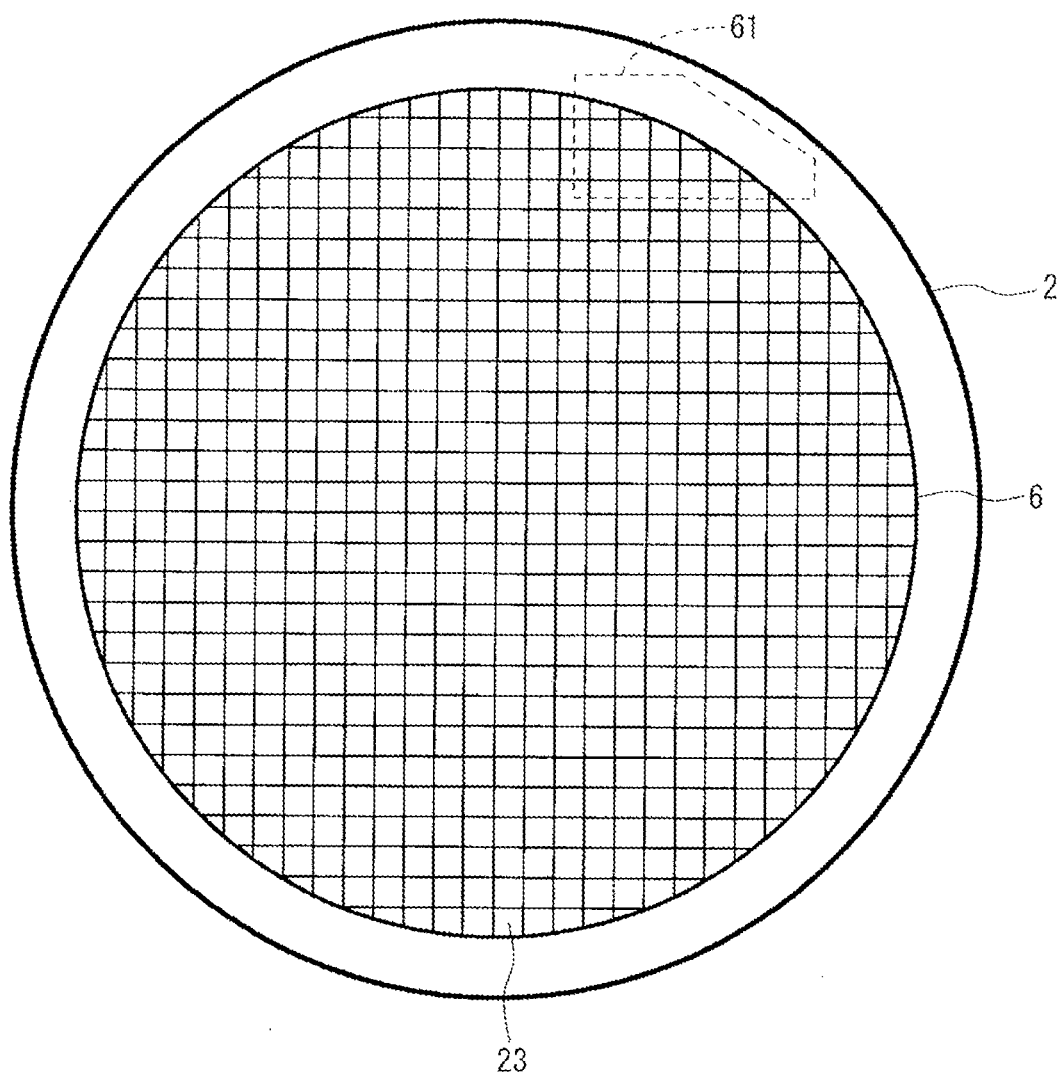
FIG. 1 is a diagram schematically illustrating the shape of a plurality of pixel electrodes according to a first embodiment.
Figure 4:
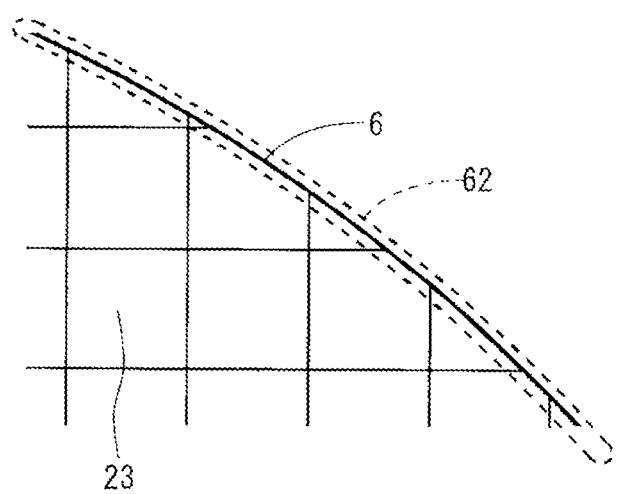
FIG. 4 is an enlarged view of a portion denoted by a reference sign 61 in FIG. 1.
Figure 5:
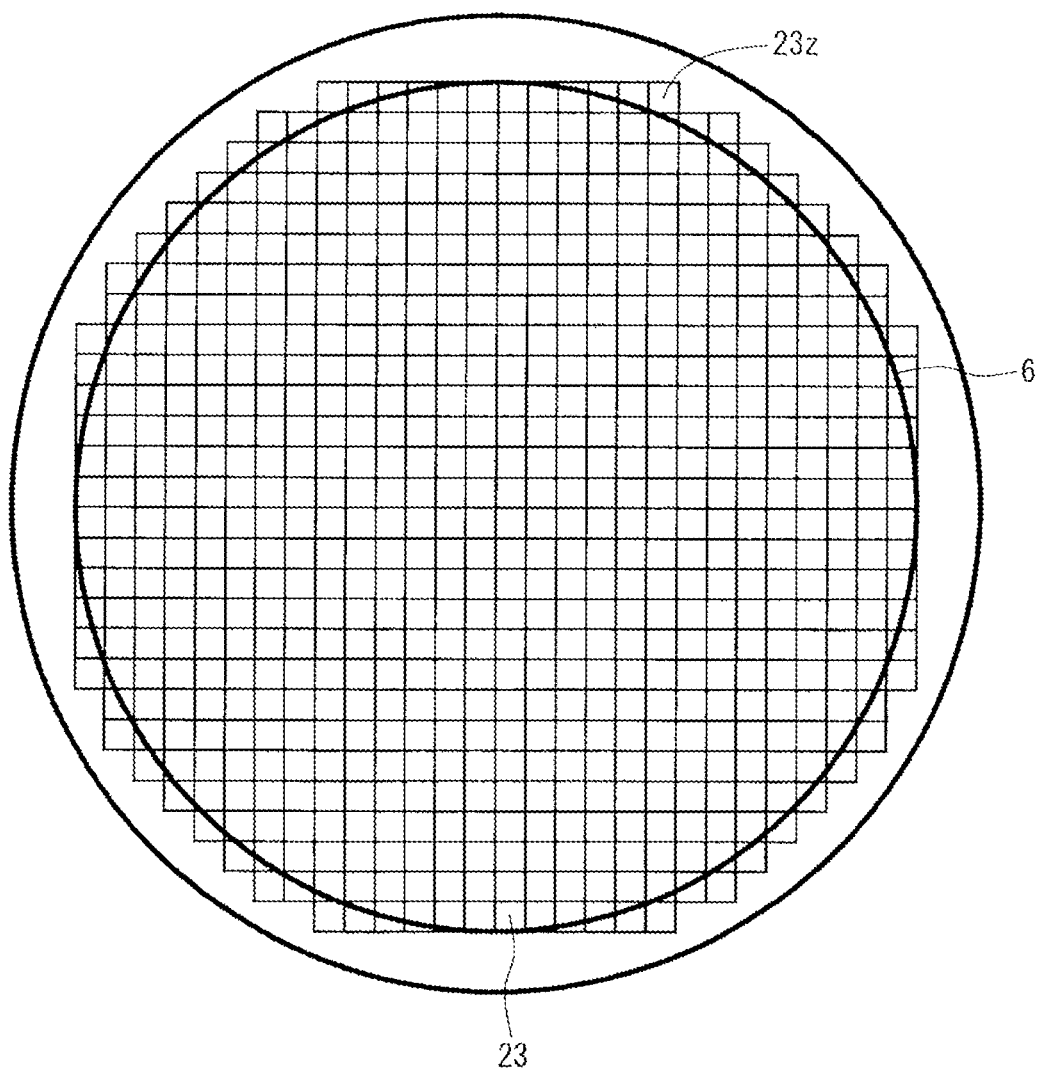
FIG. 5 is a diagram schematically illustrating the shape of the plurality of pixel electrodes according to a reference example.

Next, the pixel electrode 23 according to the present embodiment will be described in detail. FIG. 1 is a diagram schematically illustrating the shape of the plurality of pixel electrodes 23 formed on the TFT substrate 2 according to the present embodiment, and FIG. 4 is an enlarged view of a portion denoted by a reference sign 61 in FIG. 1. Note that FIG. 5 schematically illustrates the shape of the plurality of pixel electrodes 23 in a reference example for comparison with the example illustrated in FIG. 1. In the case to which attention is paid here, it is assumed that the pixel pitch is 1.2 mm, the pixel size (the size of the pixel electrode 23) is 1.195 mm×1.195 mm, the maximum number of pixels in the left-right direction in plan view of the TFT substrate 2 is 28, the maximum number of pixels in the vertical direction in a plan view of the TFT substrate 2 is 28, and the diameter of the active area 6 is 33.6 mm (i.e., the radius is 16.8 mm).

In the reference example, as understood from FIG. 5, there are a large number of pixel electrodes 23 in a state of straddling the active area 6 and the frame region 7. The pixel electrode denoted by a reference sign 23z in FIG. 5 is one of the pixel electrodes present at a position farthest from the center of the active area 6. When the position farthest from the center of the active area 6, in the region in which the pixel electrode 23z is formed, is defined as an "outermost pixel position", the distance from the center of the active area 6 to the outermost pixel position is 18.3 mm. When, of the region in which the pixel electrodes 23 are formed straddling the active area 6 and the frame region 7, the region included in the frame region 7 is defined as a "protruding region", since the radius of the active area 6 is 16.8 mm, the region extending to the outside to a maximum extent of 1.5 mm from the outer edge portion of the active area 6 is the protruding region. In the reference example, the presence of such a protruding region is a factor that inhibits frame narrowing.

On the other hand, in the present embodiment, there is no pixel electrode 23 straddling the active area 6 and the frame region 7 (see FIGS. 1 and 4). That is, the protruding region is not present. With regard to this, when a portion corresponding to the outer edge portion of the active area 6 (a portion denoted by a reference sign 62 in FIG. 4) is defined as a "boundary portion", the pixel electrode 23 located at the boundary portion 62 has a shape obtained by removing a portion included in the frame region 7 from the shape of the normal pixel electrode 23 so that the entire pixel electrode 23 is included in the active area 6. In this way, in the present embodiment, the size of the pixel electrode 23 located at the boundary portion 62 is smaller than the size of the pixel electrode 23 not located at the boundary portion 62.

Here, as described above, in the TFT-LCD, when the pixel size in the boundary portion 62 only is made smaller than the normal pixel size, when display at constant luminance is to be performed, for example, display is performed at different luminance in the boundary portion and in the portions other than the boundary portion. Therefore, in the present embodiment, a configuration is adopted in which a voltage is always applied to the plurality of pixel electrodes 23 provided on the TFT substrate 2 such that a voltage is applied to the pixel electrodes 23 not located at the boundary portion 62 and to the pixel electrodes 23 located at the boundary portion 62 in the same manner.

1.3 Configuration Relating to Driving of Wiring Electrodes

Hereinafter, a configuration relating to the driving of the wiring electrodes 24 will be described. With the configuration to be described below, a voltage is always applied to the plurality of pixel electrodes 23 provided on the TFT substrate 2. Here, for convenience of explanation, it is assumed that 960pixel electrodes 23 are present on the TFT substrate 2.

1.3.1 Overview

Figure 6:
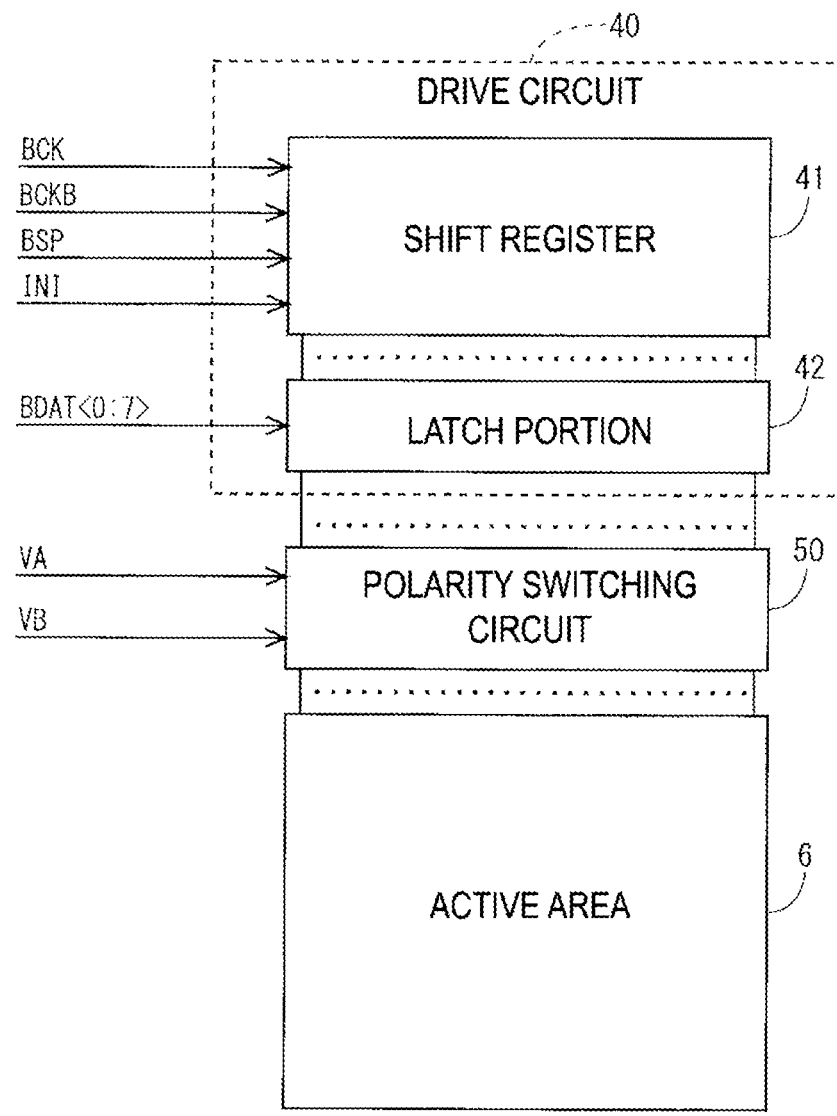
FIG. 6 is a functional block diagram for describing a configuration relating to driving of wiring electrodes, according to the first embodiment.

In the present embodiment, as illustrated in FIG. 6, the drive circuit 40 and a polarity switching circuit 50 are provided in a region outside the active area 6 (i.e., in the frame region 7), as constituent elements relating to the driving of the wiring electrodes 24. The drive circuit 40 includes a shift register 41 and a latch portion 42. Note that the pixel transistors 30 are included in the polarity switching circuit 50.

A control clock signal BCK, a control clock signal BCKB, a start pulse signal BSP, and an initialization signal INI are provided to the shift register 41 via the signal wiring line group 22 (see FIG. 3). The internal state of the shift register 41 is initialized on the basis of the initialization signal INI. The shift register 41 performs shift operation on the basis of the control clock signal BCK, the control clock signal BCKB, and the start pulse signal BSP. Then, on the basis of the shift operation, an output signal from each of unit circuits described below is output as a timing signal, which represents capturing timing of a data signal.

A data signal BDAT<0:7> representing binary data is provided to the latch portion 42 via the signal wiring line group 22. Note that the data signal BDAT<0:7> is 8-bit data. The latch portion 42 includes a plurality of latch circuits, and each of the latch circuits captures a corresponding data signal on the basis of the corresponding timing signal (the timing signal output from the shift register 41), and outputs the data signal captured.

A white display voltage VA and a black display voltage VB are provided to the polarity switching circuit 50 via the signal wiring line group 22. With regard to the white display voltage VA and the black display voltage VB, the voltage levels thereof change in a mutually inverted manner between the high level (first level) and the low level (second level) at the predetermined interval. The polarity switching circuit 50 includes a plurality of polarity control units respectively corresponding to the plurality of wiring electrodes 24 in the active area 6, and each of the polarity control units applies one of the white display voltage VA or the black display voltage VB to the corresponding wiring electrode 24, on the basis of the data signal output from the corresponding latch circuit. Note that, in the present embodiment, a first voltage is realized by the white display voltage VA, and a second voltage is realized by the black display voltage VB.

As a result of the voltage (the white display voltage VA or the black display voltage VB) corresponding to the data signal BDAT<0:7> being applied to each of the pixel electrodes 23 as described above, a desired image is displayed in the active area 6.

1.3.2 Detailed Configuration of Drive Circuit

Figure 7:
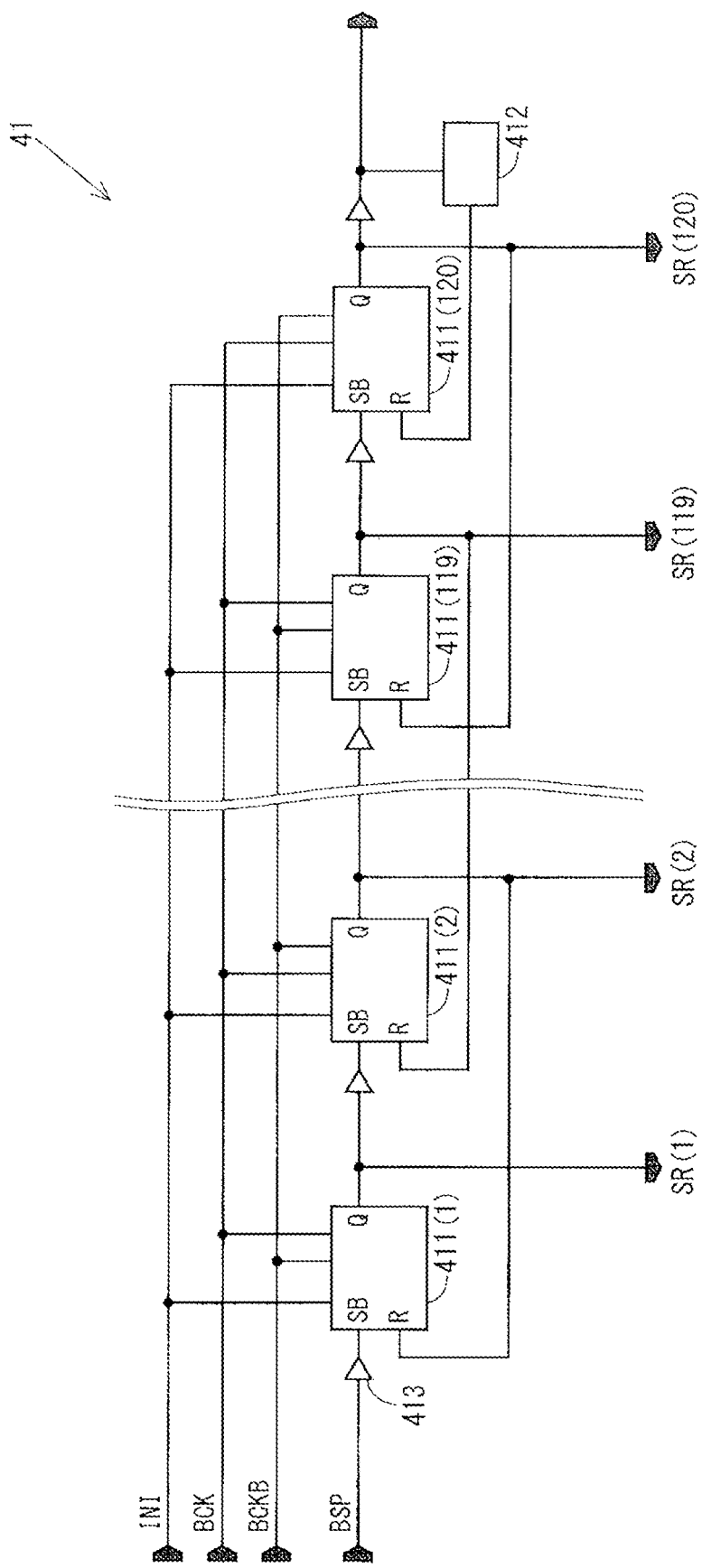
FIG. 7 is a block diagram illustrating a configuration of a shift register, according to the first embodiment.

FIG. 7 is a circuit diagram illustrating a detailed configuration of the shift register 41. As illustrated in FIG. 7, the shift register 41 is constituted by 120 unit circuits 411(1) to 411(120) connected in series, a reset signal generation circuit 412, and a plurality of buffers 413. Each of the unit circuits 411 is a flip-flop circuit. As described above, the control clock signal BCK, the control clock signal BCKB, the start pulse signal BSP, and the initialization signal INI are provided to the shift register 41. The state of the unit circuits 411(1) to 411(120) is initialized on the basis of the initialization signal INI. An output signal Q from the unit circuit 411 at the preceding stage is provided to each of the unit circuits 411 as a set signal SB, and the output signal Q from the unit circuit 411 at the next stage is provided to each of the unit circuits 411 as a reset signal R. However, the start pulse signal BSP is provided to the unit circuit 411(1) at the first stage as the set signal SB, and a signal generated by the reset signal generation circuit 412 is provided to the unit circuit 411(120) at the 120th stage as the reset signal R. In each of the unit circuits 411, after the set signal SB is set to the high level, the output signal Q is set to the high level on the basis of the control clock signals BCK and BCKB (i.e., a shift pulse is output). Then, as a result of the reset signal R being set to the high level, the output signal Q is set to the low level.

Figure 8:
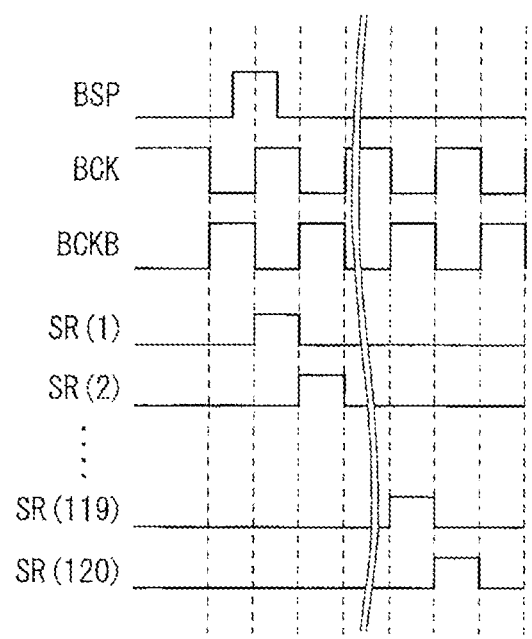
FIG. 8 is a signal waveform diagram for describing operation of the shift register, according to the first embodiment.

Since the unit circuits 411 operate as described above, after the pulse of the start pulse signal BSP is generated, the output signals Q from the unit circuits 411 are set to the high level stage by stage, on the basis of the control clock signals BCK and BCKB. In other words, the high-level output signal Q output from each of the unit circuits 411 is transferred sequentially from the first stage to the 120th stage, as a shift pulse. Further, the output signal Q from each of the unit circuits 411 is provided to the unit circuits 411 at the next stage and at the preceding stage, and is also provided to the latch circuit as a timing signal SR. As described above, as illustrated in FIG. 8, after the pulse of the start pulse signal BSP is generated, on the basis of the control clock signals BCK and BCKB, the timing signals are sequentially set to the high level (active) for a predetermined time period each time, in the order of "the timing signal SR(1), the timing signal SR(2), . . . , the timing signal SR(119), and the timing signal SR(120)".

Figure 9:
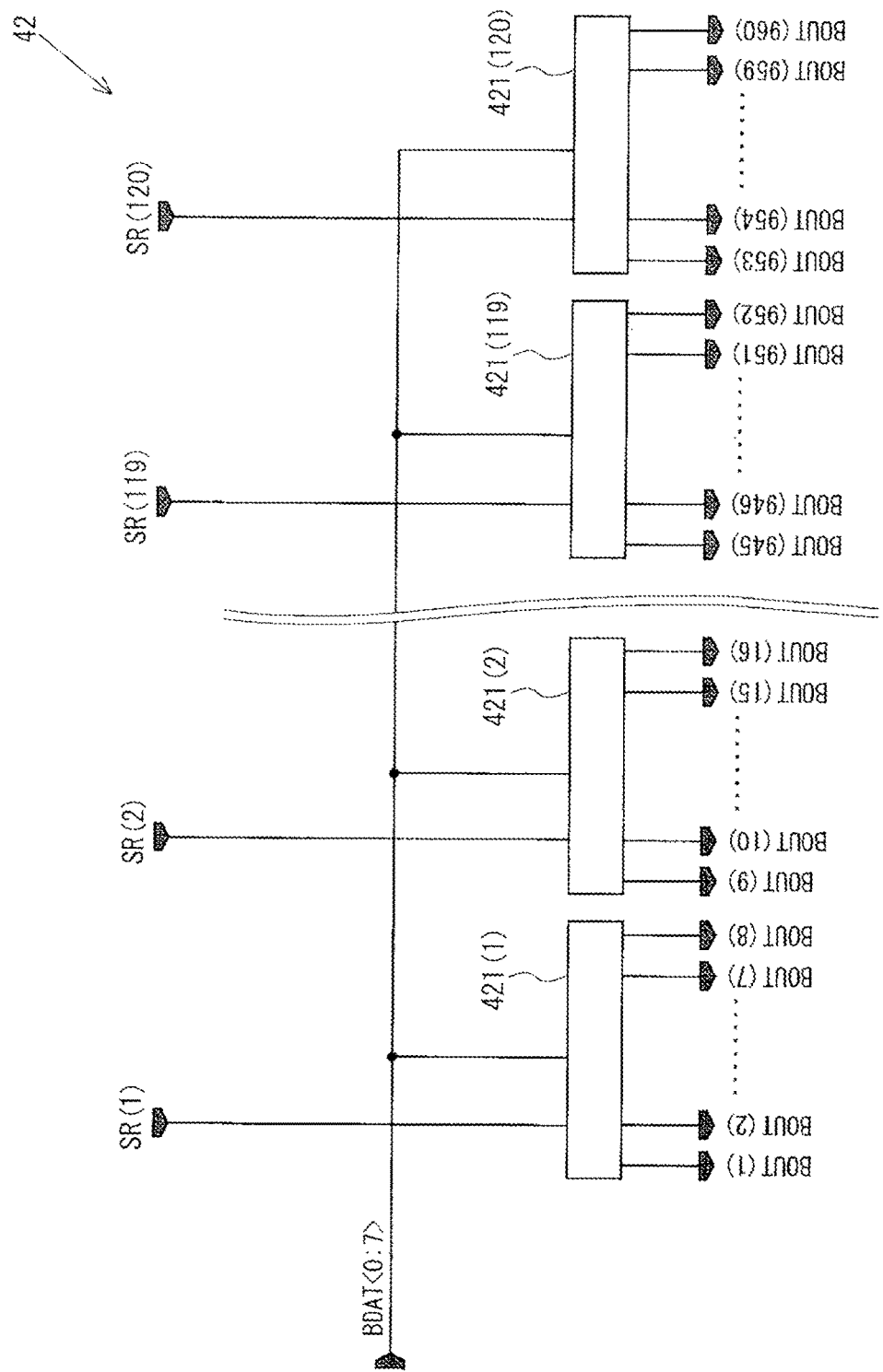
FIG. 9 is a block diagram illustrating a configuration of a latch portion, according to the first embodiment.

FIG. 9 is a block diagram illustrating a configuration of the latch portion 42. As illustrated in FIG. 9, the latch portion 42 is constituted by 120 latch circuit groups 421(1) to 421(120). Each of the latch circuit groups 421 includes eight of the latch circuits. Therefore, 960 of the latch circuits are provided in total. The data signal BDAT<0:7> and the timing signal SR output from the shift register 41 are provided to each of the latch circuit groups 421. When the input timing signal SR changes from the low level to the high level, each of the latch circuit groups 421 captures the data signal BDAT<0:7>, and outputs the data signal captured. Note that the data signal output from the latch circuit is denoted by a reference sign BOUT. Since the timing signals SR are set to the high level in the order of "the timing signal SR(1), the timing signal SR(2), . . . , the timing signal SR(119), and the timing signal SR(120)" as described above (see FIG. 8), the capturing of the data signal BDAT<0:7> at the latch circuit groups 421 is performed in the order of "the latch circuit group 421(1), the latch circuit group 421(2), . . . , the latch circuit group 421(119), and the latch circuit group 421(120)".

In this way, after the pulse of the start pulse signal BSP is generated, the capturing of the data signal BDAT<0:7> by the latch circuit group 421 is performed every time the logic levels of the control clock signal BCK and the control clock signal BCKB are inverted. In other words, when the logic levels of the control clock signal BCK and the control clock signal BCKB are inverted, 8 bits of data are captured once by the latch circuit group 421. Thus, after the pulse of the start pulse signal BSP is generated, at a time point at which the logic levels of the control clock signal BCK and the control clock signal BCKB have been inverted 120 times, the capturing of the data corresponding to all the pixel electrodes 23 by the latch circuits is completed.

Figure 10:
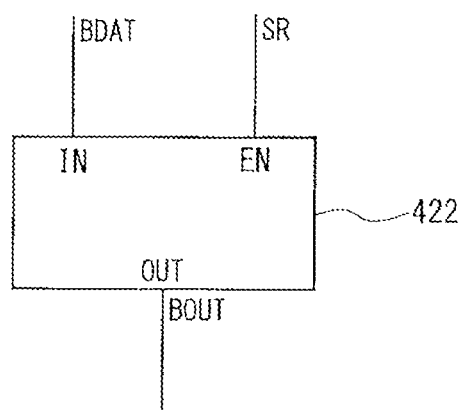
FIG. 10 is a diagram for describing an outline of one latch circuit, according to the first embodiment.

FIG. 10 is a diagram for describing an outline of one latch circuit (a latch circuit corresponding to 1 bit of data) 422. The data signal BDAT of 1 bit is provided to the latch circuit 422 as an input signal IN, and the timing signal SR output from the shift register 41 is provided to the latch circuit 422 as an enable signal EN. Then, an output signal OUT output from the latch circuit 422 is provided to the polarity switching circuit 50 as the data signal BOUT.

Figure 11:
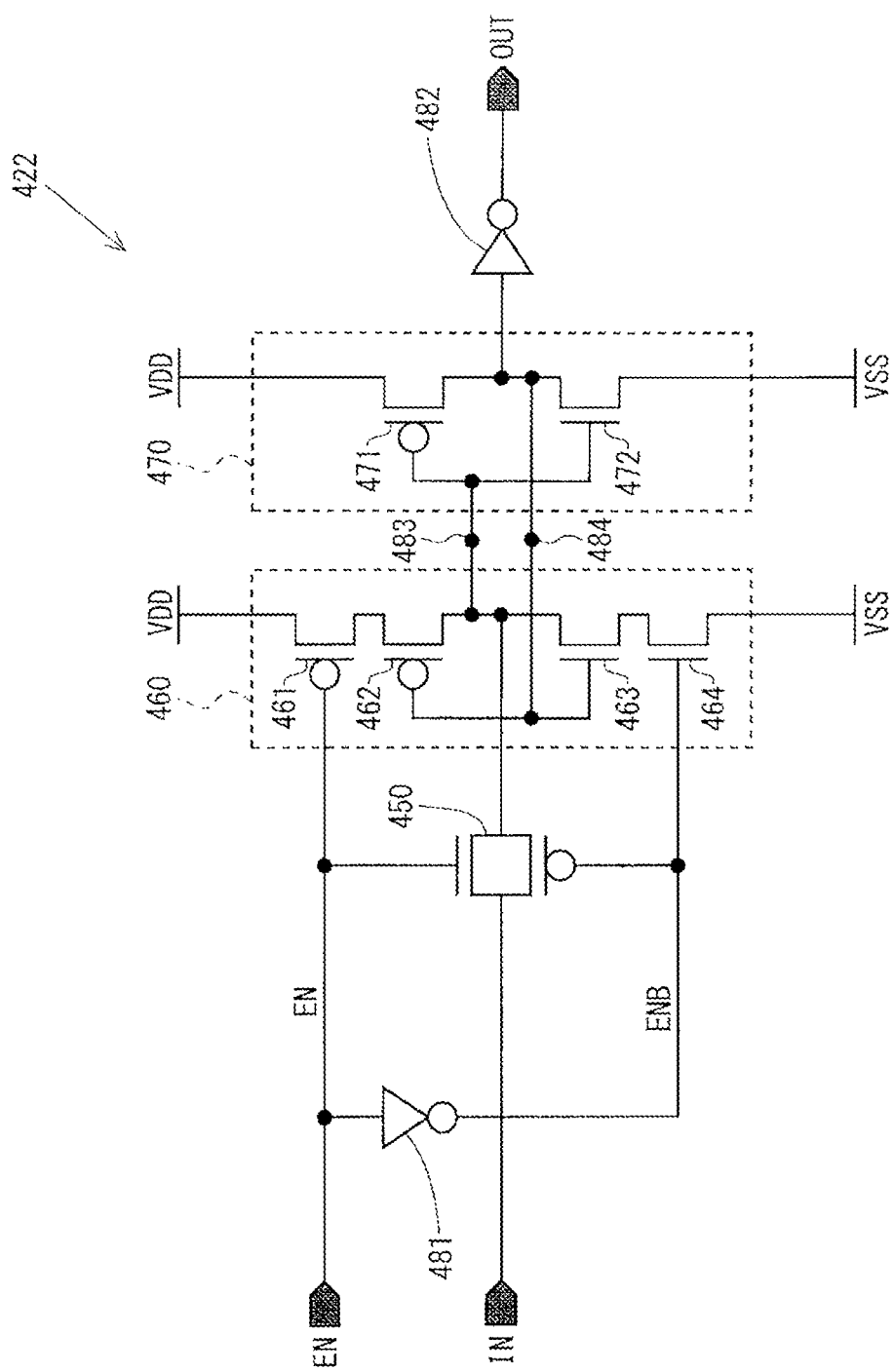
FIG. 11 is a circuit diagram illustrating a detailed configuration of the one latch circuit, according to the first embodiment.

FIG. 11 is a circuit diagram illustrating a detailed configuration of the one latch circuit 422. Note that the configuration described here is merely an example, and the configuration is not limited to this example. The latch circuit 422 includes an inverter 481, a CMOS switch 450 constituted by an n-channel transistor and a p-channel transistor, a clocked inverter 460 constituted by a p-channel transistor 461, a p-channel transistor 462, an n-channel transistor 463, and an n-channel transistor 464, a CMOS inverter 470 constituted by a p-channel transistor 471 and an n-channel transistor 472, and an inverter 482.

The enable signal EN input to the latch circuit 422 is provided to a gate terminal of the n-channel transistor constituting the CMOS switch 450. Further, as a result of the inverter 481 being provided as illustrated in FIG. 11, an inverted enable signal ENB is provided to a gate terminal of the p-channel transistor constituting the CMOS switch 450. In the configuration described above, when the enable signal EN is at the high level, the CMOS switch 450 is set to the on state, and thus, the input signal IN is provided to the clocked inverter 460. On the other hand, when the enable signal EN is at the low level, the CMOS switch 450 is set to the off state, and thus, the input signal IN is not provided to the clocked inverter 460.

An input terminal of the clocked inverter 460 is connected to a node 484, and an output terminal thereof is connected to a node 483. An input terminal of the CMOS inverter 470 is connected to the node 483, and an output terminal thereof is connected to the node 484. Further, when the enable signal EN is at the low level, both the p-channel transistor 461 and the n-channel transistor 464 are set to the on state, and when the enable signal EN is at the high level, both the p-channel transistor 461 and the n-channel transistor 464 are set to the off state. In the configuration described above, the value of the input signal IN input to the latch circuit 422 when the enable signal EN is at the high level is held by the clocked inverter 460 and the CMOS inverter 470, throughout a period until the enable signal EN is set to the high level once again. Incidentally, when the input signal IN is at the high level, the potential of the node 483 is set to the high level, and the output signal OUT is also set to the high level. On the other hand, when the input signal IN is at the low level, the potential of the node 483 is set to the low level, and the output signal OUT is also set to the low level.

Note that, as described above, in the present embodiment, eight of the latch circuits 422 are included in each of the latch circuit groups 421. In other words, the eight latch circuits 422 are provided for one timing signal. However, the configuration is not limited thereto, and a configuration can be adopted in which the drive circuit 40 includes M latch circuits 422 for one timing signal, M being an integer of 2 or more. In this case, the M latch circuits 422 capture M data signals (M bits of data) based on the corresponding timing signals SR, and output the M data signals captured.

1.3.3 Detailed Configuration of Polarity Switching Circuit

Figure 12:
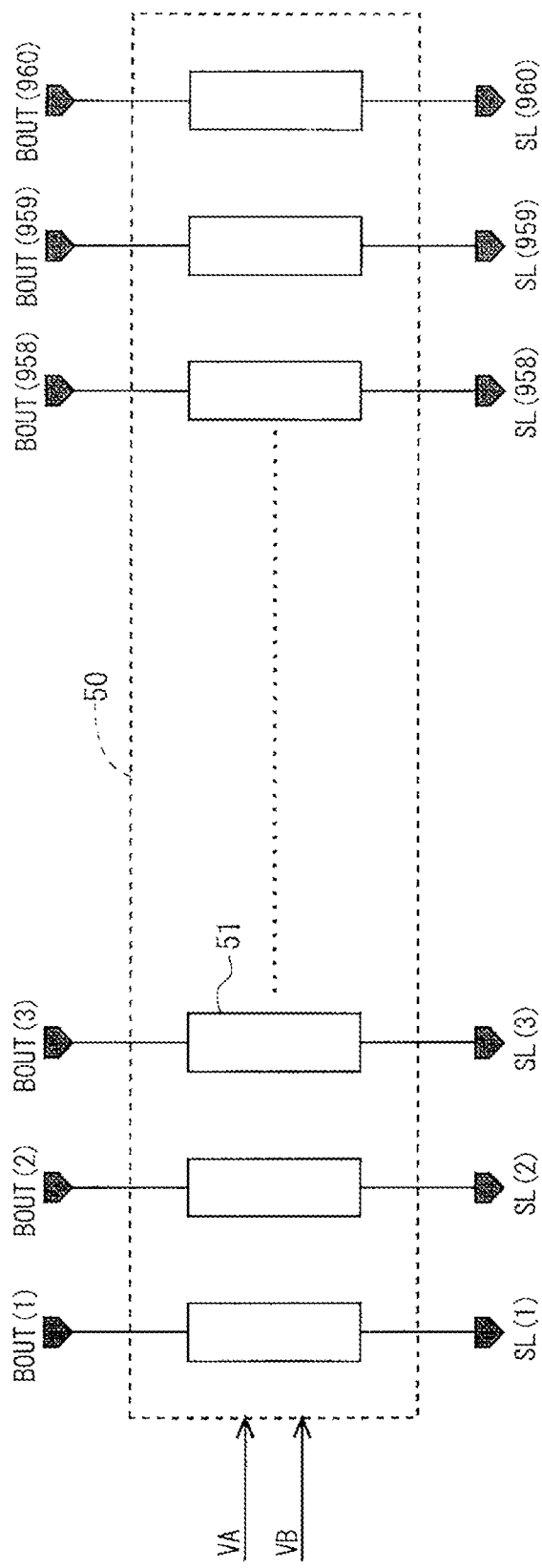
FIG. 12 is a block diagram illustrating a schematic configuration of a polarity switching circuit, according to the first embodiment.

FIG. 12 is a block diagram illustrating a schematic configuration of the polarity switching circuit 50. As illustrated in FIG. 12, the polarity switching circuit 50 is constituted by 960 polarity control units 51 respectively corresponding to the 960 wiring electrodes 24. On the basis of the data signal BOUT, each of the polarity control units 51 outputs one of the white display voltage VA or the black display voltage VB, as a data signal SL to be applied to the wiring electrode 24.

Figure 13:
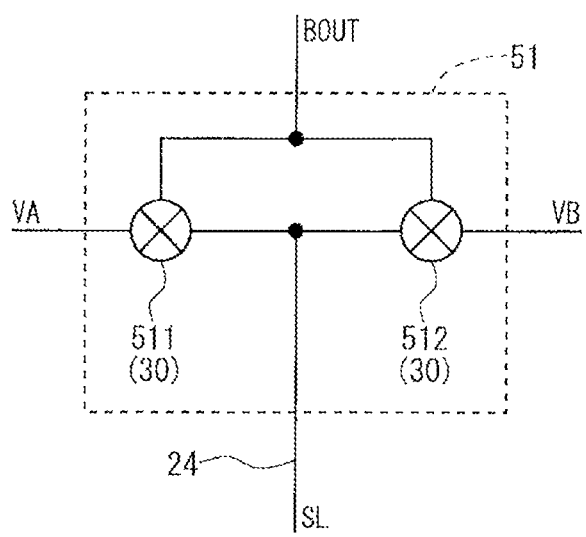
FIG. 13 is a circuit diagram illustrating a schematic configuration of a polarity control unit, according to the first embodiment.

FIG. 13 is a diagram illustrating a schematic configuration of the polarity control unit 51. As illustrated in FIG. 13, the polarity control unit 51 includes two switches 511 and 512 for which the on/off state is controlled on the basis of the data signal BOUT. The on/off states of the switch 511 and the switch 512 change in a mutually inverted manner. The two switches 511 and 512 function as the pixel transistors 30. For example, when the data signal BOUT is at the high level, the switch 511 is set to the off state and the switch 512 is set to the on state, and when the data signal BOUT is at the low level, the switch 511 is set to the on state and the switch 512 is set to the off state. As a result, when the data signal BOUT is at the high level, the black display voltage VB is applied to the wiring electrode 24 as the data signal SL, and when the data signal BOUT is at the low level, the white display voltage VA is applied to the wiring electrode 24 as the data signal SL. Two more detailed examples relating to the configuration of the polarity control unit 51 will be described below.

Figure 14:
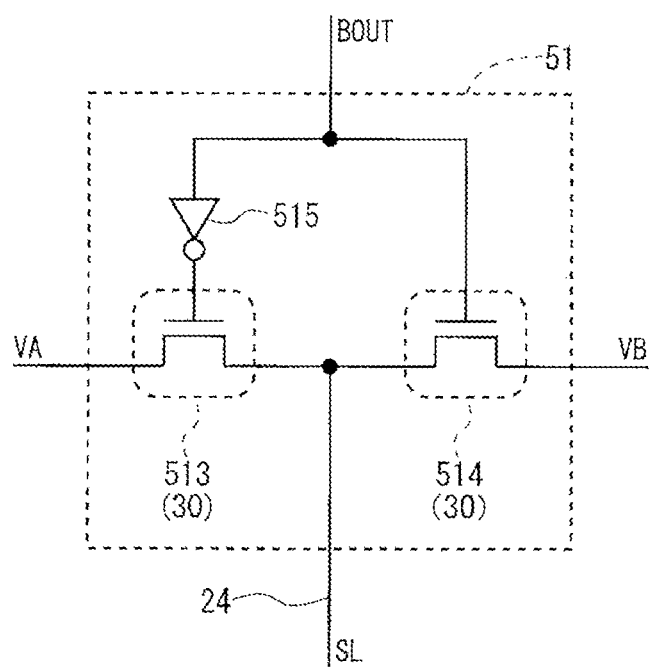
FIG. 14 is a circuit diagram illustrating a detailed configuration of the polarity control unit that uses a single channel switch, according to the first embodiment.

FIG. 14 is a circuit diagram illustrating a detailed configuration of the polarity control unit 51 that uses a single channel switch. As illustrated in FIG. 14, the polarity control unit 51 is constituted by an n-channel transistor 513, an n-channel transistor 514, and an inverter 515. The n-channel transistor 513 and the n-channel transistor 514 function as the pixel transistors 30. The data signal BOUT is provided to an input terminal of the inverter 515, and an output terminal of the inverter 515 is connected to a control terminal of the n-channel transistor 513. The data signal BOUT is provided to a control terminal of the n-channel transistor 514. The white display voltage VA is provided to a first conduction terminal of the n-channel transistor 513, and a second conduction terminal of the n-channel transistor 513 is connected to the wiring electrode 24. The black display voltage VB is provided to a first conduction terminal of the n-channel transistor 514, and a second conduction terminal of the n-channel transistor 514 is connected to the wiring electrode 24.

According to the configuration described above, when the data signal BOUT is at the high level, the n-channel transistor 513 is set to the off state and the n-channel transistor 514 is set to the on state, and thus, the black display voltage VB is applied to the wiring electrode 24 as the data signal SL. On the other hand, when the data signal BOUT is at the low level, the n-channel transistor 513 is set to the on state and the n-channel transistor 514 is set to the off state, and thus, the white display voltage VA is applied to the wiring electrode 24 as the data signal SL. In this way, a voltage (the white display voltage VA or the black display voltage VB) is always applied to the pixel electrode 23 via the wiring electrode 24.

Note that, in the example illustrated in FIG. 14, a first pixel transistor is realized by the n-channel transistor 513, and a second pixel transistor is realized by the n-channel transistor 514.

Figure 15:
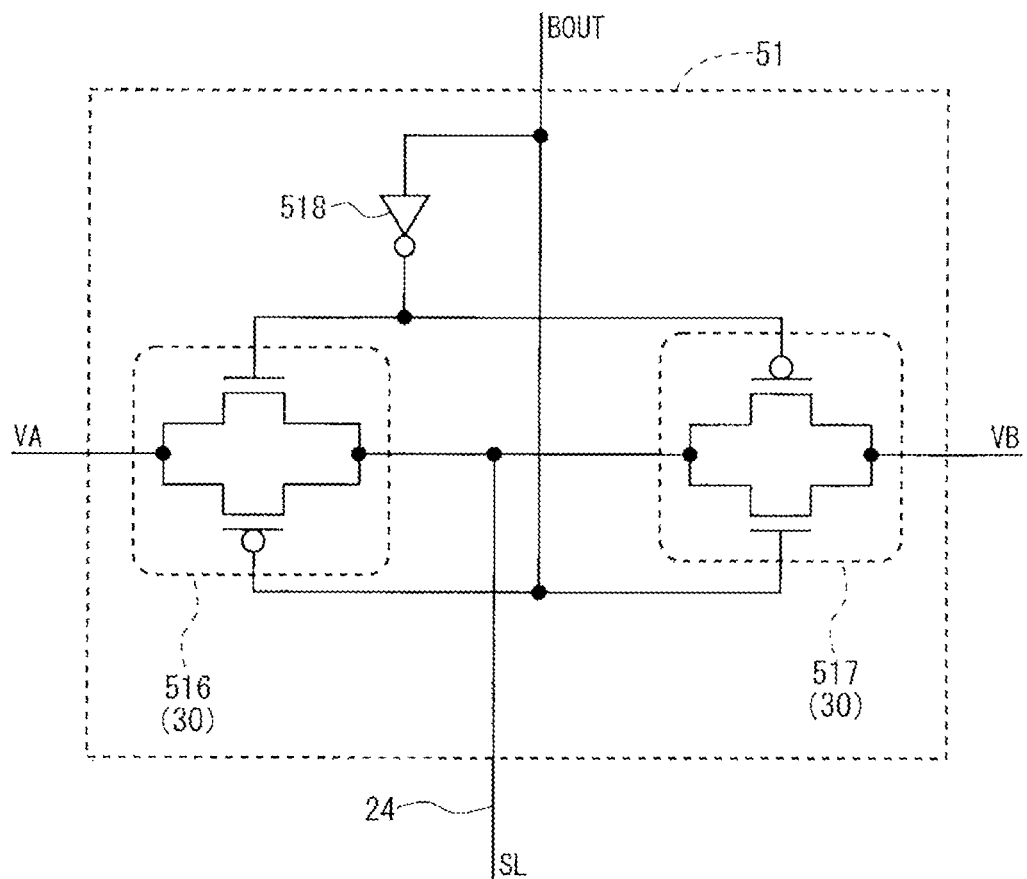
FIG. 15 is a circuit diagram illustrating a detailed configuration of the polarity control unit that uses a complementary metal oxide semiconductor (CMOS) switch, according to the first embodiment.

FIG. 15 is a circuit diagram illustrating a detailed configuration of the polarity control unit 51 that uses a CMOS switch. As illustrated in FIG. 15, the polarity control unit 51 is constituted by a CMOS switch 516, a CMOS switch 517, and an inverter 518. The CMOS switch 516 and the CMOS switch 517 function as the pixel transistor 30. The data signal BOUT is provided to an input terminal of the inverter 518, and an output terminal of the inverter 518 is connected to a control terminal of an n-channel transistor constituting the CMOS switch 516, and to a control terminal of a p-channel transistor constituting the CMOS switch 517. The data signal BOUT is provided to a control terminal of a p-channel transistor constituting the CMOS switch 516, and a control terminal of an n-channel transistor constituting the CMOS switch 517. The white display voltage VA is provided to an input terminal of the CMOS switch 516, and an output terminal of the CMOS switch 516 is connected to the wiring electrode 24. The black display voltage VB is provided to an input terminal of the CMOS switch 517, and an output terminal of the CMOS switch 517 is connected to the wiring electrode 24.

According to the configuration described above, when the data signal BOUT is at the high level, the CMOS switch 516 is set to the off state and the CMOS switch 517 is set to the on state, and thus, the black display voltage VB is applied to the wiring electrode 24 as the data signal SL. On the other hand, when the data signal BOUT is at the low level, the CMOS switch 516 is set to the on state and the CMOS switch 517 is set to the off state, and thus, the white display voltage VA is applied to the wiring electrode 24 as the data signal SL. In this way, a voltage (the white display voltage VA or the black display voltage VB) is always applied to the pixel electrode 23 via the wiring electrode 24.

Note that, in the example illustrated in FIG. 15, the first pixel transistor is realized by the n-channel transistor and the p-channel transistor constituting the CMOS switch 516, and the second pixel transistor is realized by the n-channel transistor and the p-channel transistor constituting the CMOS switch 517.

Figure 16:
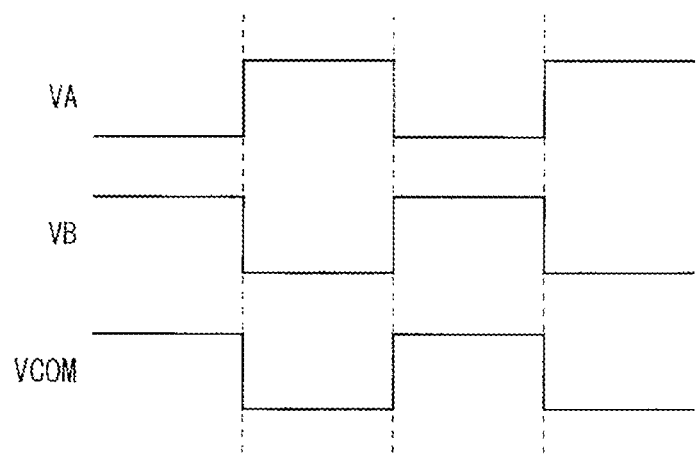
FIG. 16 is a signal waveform diagram for describing switching of polarities of a liquid crystal application voltage, according to the first embodiment.

FIG. 16 is a signal waveform diagram for describing switching of polarities of a liquid crystal application voltage. As illustrated in FIG. 16, with regard to the white display voltage VA and the black display voltage VB, the voltage levels thereof change in a mutually inverted manner between the high level and the low level at a predetermined interval. Further, also with regard to the voltage level of a common electrode drive signal VCOM applied to the common electrode, the voltage level thereof changes between the high level and the low level at the predetermined interval. Here, a positive polarity voltage is applied to the liquid crystal 4 during a period in which the voltage level of the common electrode drive signal VCOM is at the low level. On the other hand, a negative polarity voltage is applied to the liquid crystal 4 during a period in which the voltage level of the common electrode drive signal VCOM is at the high level. Since the polarity of the liquid crystal application voltage is inverted at the predetermined interval in this way, deterioration of the liquid crystal 4 is suppressed.

1.4 Effects

According to the present embodiment, the size of the pixel electrode 23 located at the boundary portion 62 between the active area 6 and the frame region 7 is smaller than the size of the pixel electrode 23 not located at the boundary portion 62. Specifically, the pixel electrode 23 located at the boundary portion 62 has a shape obtained by removing a portion included in the frame region 7 from the shape of the normal pixel electrode 23 so that the entire pixel electrode 23 is included in the active area 6. Thus, the above-described protruding region is not present. In such a configuration, a voltage is always applied to all the pixel electrodes 23. Therefore, the luminance difference and the deterioration of the liquid crystal due to a difference in the magnitude of the feed-through voltage between the boundary portion 62 and the portion other than the boundary portion 62 do not occur. As described above, according to the present embodiment, in the liquid crystal display device including the circular active area (display region) 6, frame narrowing is realized without causing a deterioration in the display quality and reliability.

2. Second Embodiment

A second embodiment will be described below. Note that the configuration relating to the driving of the wiring electrode 24 is the same as that of the first embodiment described above.

2.1 Details of Pixel Electrode

In the first embodiment, in order to prevent the generation of the protruding region (the region, of the region in which the pixel electrode 23 is formed in the state straddling the active area 6 and the frame region 7, included in the frame region 7), the pixel electrode 23 located at the boundary portion 62 has the shape obtained by removing the portion included in the frame region 7 from the shape of the normal pixel electrode 23 so that the entire portion of the pixel electrode 23 is included in the active area 6. In other words, the pixel electrode 23 straddling the active area 6 and the frame region 7 is not present.

Figure 17:
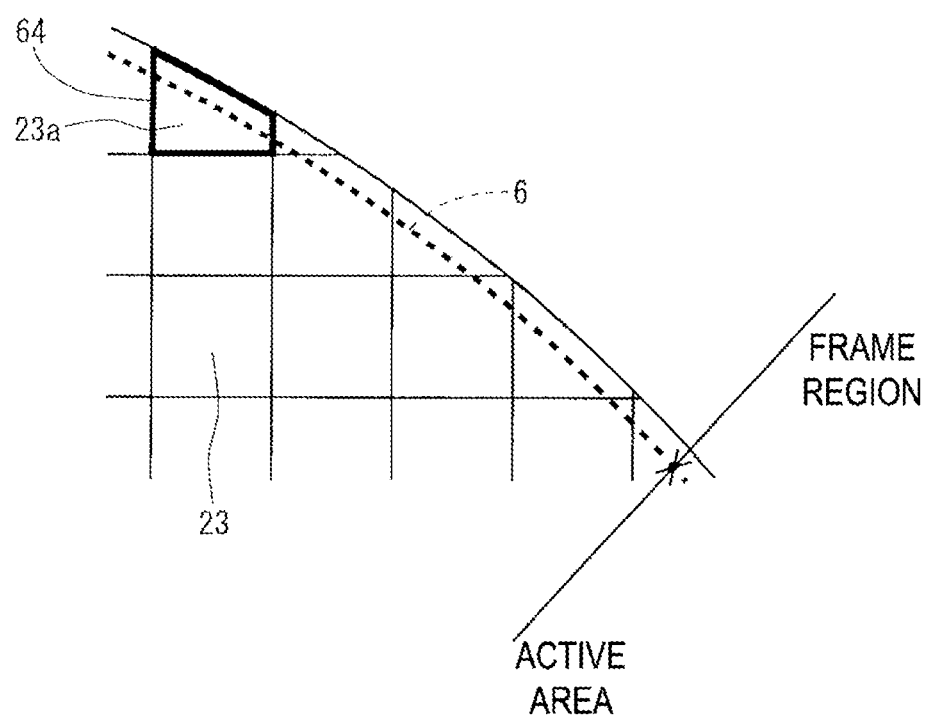
FIG. 17 is a diagram for describing pixel electrodes located at a boundary portion between an active area and a frame region, according to a second embodiment.

In contrast to this, in the present embodiment, in consideration of a bonding tolerance between the TFT substrate 2 and the counter substrate 3, the pixel electrodes 23 located at the boundary portion between the active area 6 and the frame region 7 are in a state of straddling the active area 6 and the frame region 7, as illustrated in FIG. 17. That is, the protruding region is present. For example, the pixel electrode denoted by a reference sign 23a has a shape represented by a thick solid line denoted by a reference sign 64. In addition, as understood from FIG. 17, of the pixel electrode located at the boundary portion, the outer edge of the portion included in the frame region forms an arc. Here, since the protruding region is formed in consideration of the bonding tolerance between the TFT substrate 2 and the counter substrate 3, the size of the protruding region is set to a size that hardly affects the frame narrowing of the liquid crystal display device.

Figure 18:
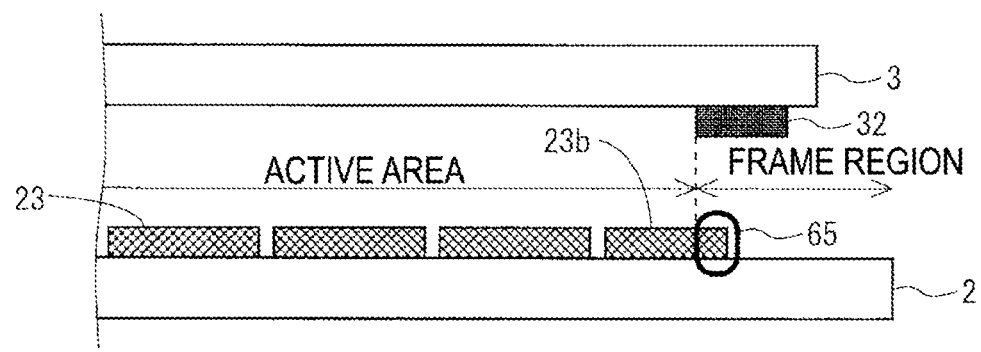
FIG. 18 is a cross-sectional view at or near the boundary portion, according to the second embodiment.

Further, in the present embodiment, as illustrated in FIG. 18, a light blocking film 32 is formed on the counter substrate 3 at or near the boundary portion of the frame region 7. Since the light blocking film 32 is formed in this manner, a pixel electrode 23b located at the boundary portion is constituted by a portion included in the active area 6 and a portion included in a region, of the frame region 7, at which the light blocking film 32 is provided. According to the above-described configuration, even when the protruding region is present, since the light blocking film 32 is provided, an unnecessary image is not displayed in a portion outside the active area 6.

2.2 Effects

According to the present embodiment, similarly to the first embodiment, in the liquid crystal display device including the circular active area (display region) 6, frame narrowing is realized without causing a deterioration in the display quality and reliability.

2.3 Modified Examples

Modified examples of the second embodiment will be described below.

2.3.1 First Modified Example

In the above-described second embodiment, in the pixel electrode 23 located at the boundary portion, a portion is present that forms an arc in a plan view (see FIG. 17). In contrast to this, in the present modified example, the pixel electrode 23 located at the boundary portion has a shape of an N-sided polygon, where N is an integer in a range from 3 to 5. Further, the outer edge of the active area 6 forms an arc, and a side that is entirely included in the frame region 7, among the N sides constituting the N-sided polygon, is a tangent line of the arc forming the outer edge of the active area 6. In other words, the pixel electrode 23 located at the boundary portion has the shape of the N-sided polygon of which one side is a tangent line of the arc forming the outer edge of the active area 6. Also, in the present modified example, the protruding region is included in the region at which the light blocking film 32 is provided.

Figure 19:
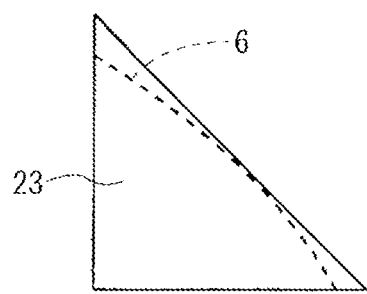
FIG. 19 is a diagram illustrating an example of the pixel electrode having a triangular shape, according to a first modified example of the second embodiment.
Figure 20:
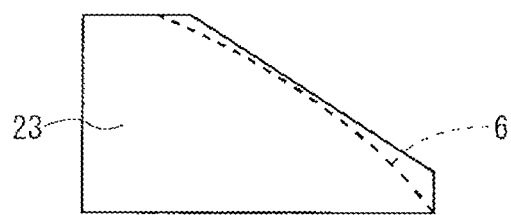
FIG. 20 is a diagram illustrating an example of the pixel electrode having a quadrangular shape, according to the first modified example of the second embodiment.
Figure 21:
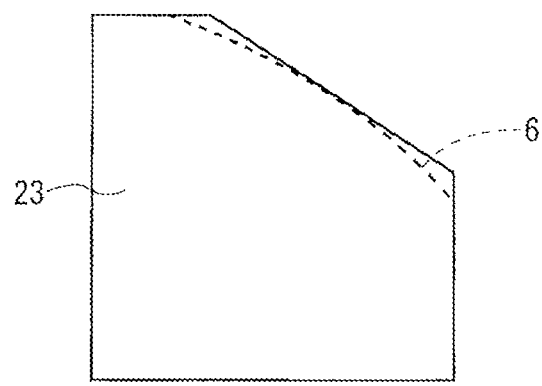
FIG. 21 is a diagram illustrating an example of the pixel electrode having a pentagonal shape, according to the first modified example of the second embodiment.

FIGS. 19 to 21 illustrate specific examples of the shape of the pixel electrode 23 located at the boundary portion. FIG. 19 illustrates an example of the pixel electrode 23 having a triangular shape, FIG. 20 illustrates an example of the pixel electrode 23 having a quadrangular shape, and FIG. 21 illustrates an example of the pixel electrode 23 having a pentagonal shape. In all of the examples, the side that is entirely included in the frame region 7 is a tangent line of the arc forming the outer edge of the active area 6.

2.3.2 Second Modified Example

Figure 22:
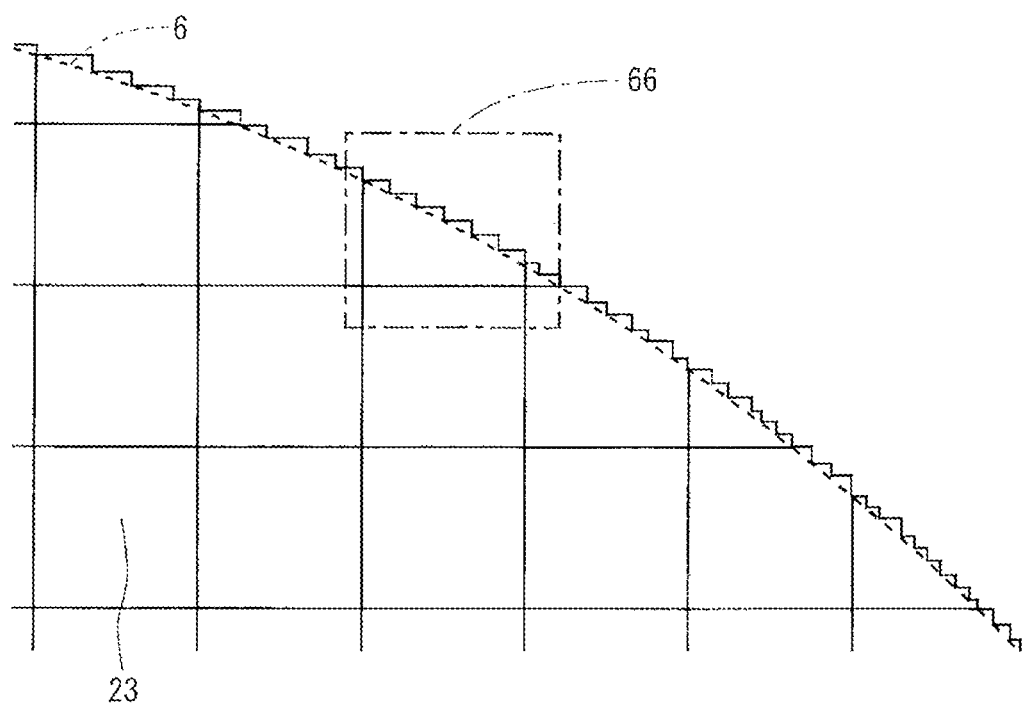
FIG. 22 is a diagram for describing the shape of the pixel electrodes located at the boundary portion between the active area and the frame region, according to a second modified example of the second embodiment.
Figure 23:
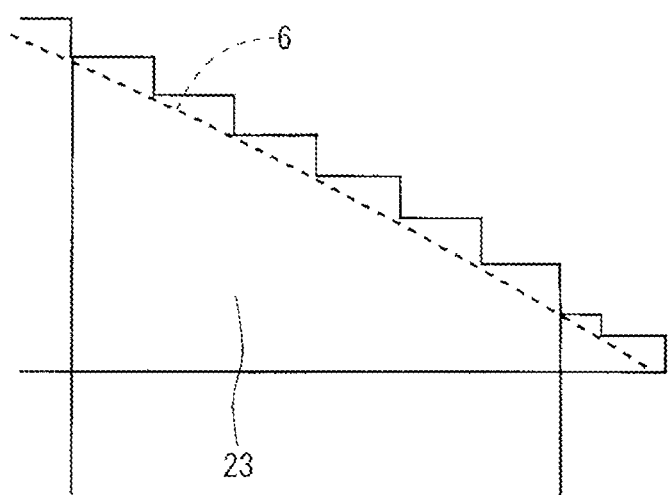
FIG. 23 is an enlarged view of a portion denoted by a reference sign 66 in FIG. 22.

FIG. 22 is a diagram for explaining the shape of the pixel electrode 23 located at the boundary portion between the active area 6 and the frame region 7 according to the present modified example. FIG. 23 is an enlarged view of a portion denoted by a reference sign 66 in FIG. 22. As can be seen from FIGS. 22 and 23, in the present modified example, of the region at which each of the pixel electrodes 23 located at the boundary portion is formed, the portion included in the frame region 7 has a stepped shape in a plan view. Also, in the present modified example, the protruding region is included in the region at which the light blocking film 32 is provided.

3. Third Embodiment

A third embodiment will be described below. Note that the configuration relating to the driving of the wiring electrode 24 is the same as that of the first embodiment described above.

3.1 Overview

Figure 24:
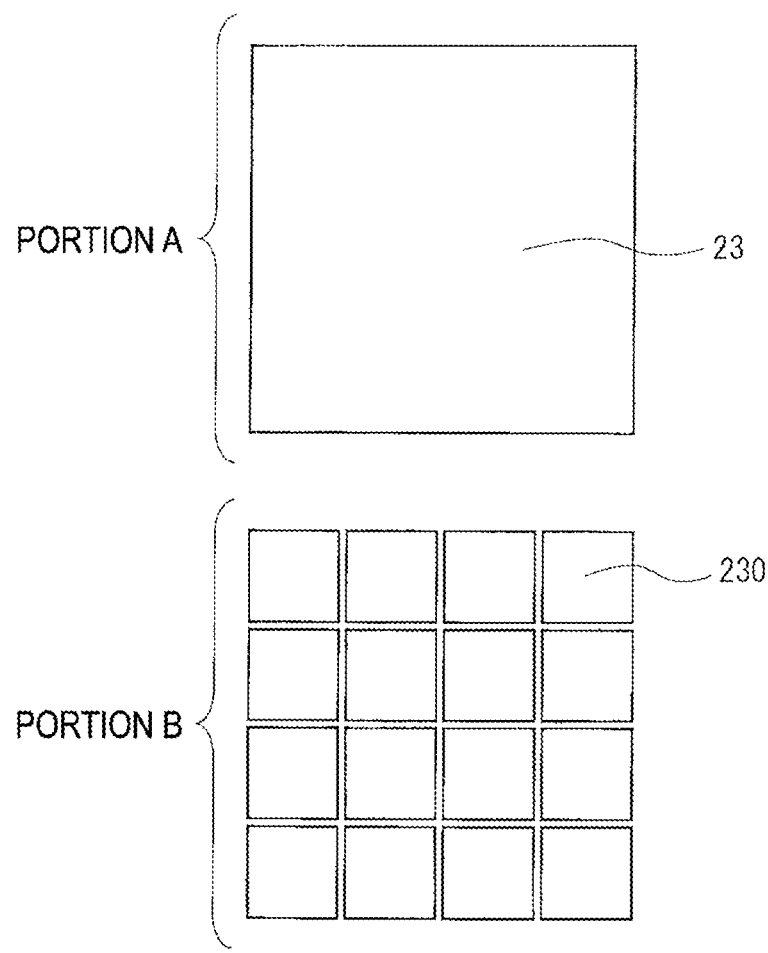
FIG. 24 is a diagram for describing provision of a plurality of subpixel electrodes obtained by dividing the pixel electrode, according to a third embodiment.
Figure 25:
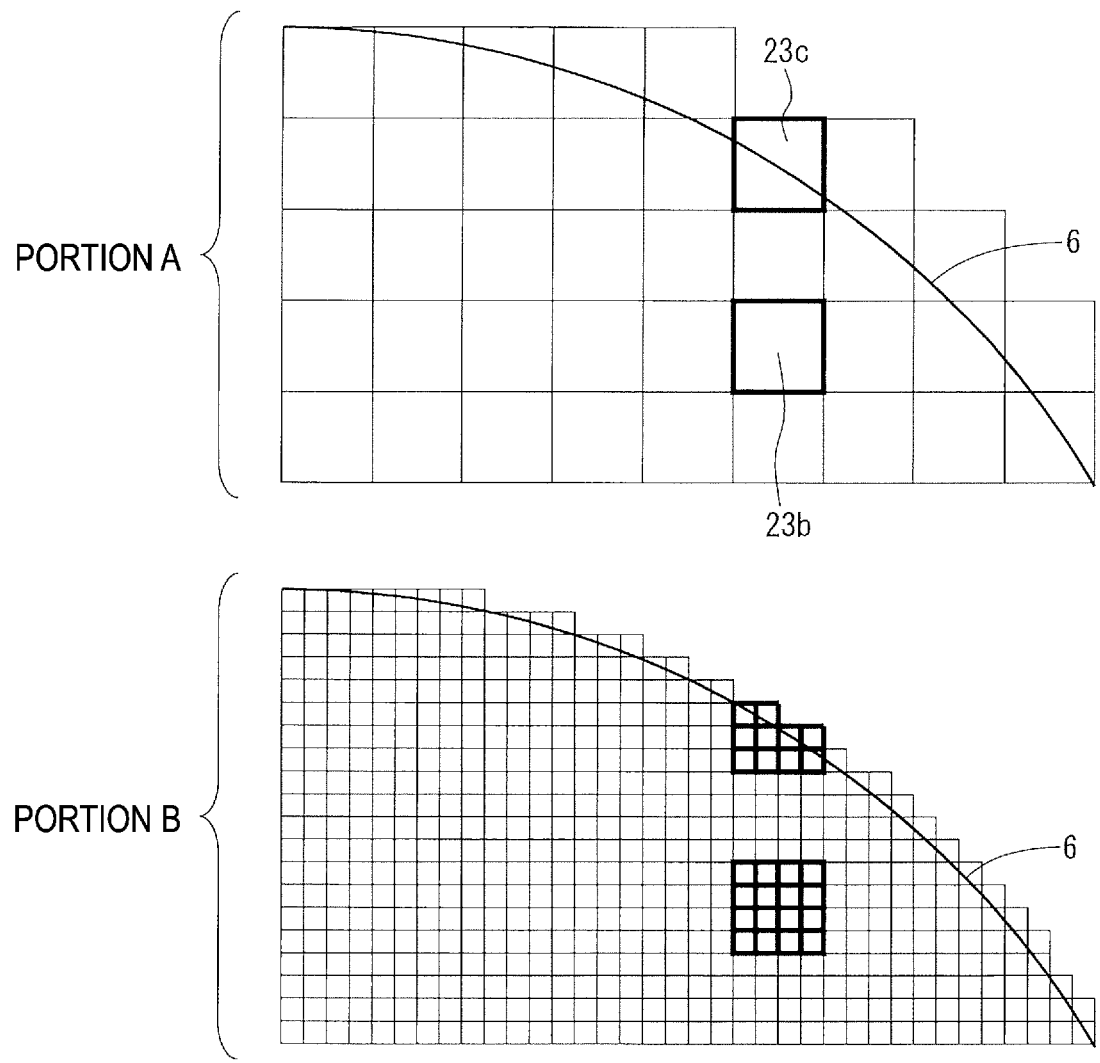
FIG. 25 is a diagram for describing the subpixel electrodes provided on the TFT substrate, according to the third embodiment.

In the present embodiment, each of the pixel electrodes 23 is divided into a plurality of subpixel electrodes that are electrically connected to each other. For example, originally, the pixel electrode 23 as illustrated in a portion A of FIG. 24 is divided into 16 (4×4) subpixel electrodes 230 as illustrated in a portion B of FIG. 24. Note that, only the subpixel electrodes 230 having at least a portion included in the active area 6 are provided on the TFT substrate 2, and the subpixel electrodes 230 that are entirely included in the frame region 7 are not provided on the TFT substrate 2. In this regard, for example, with respect to the subpixel electrodes 230 formed by dividing the pixel electrode denoted by a reference sign 23b in a portion A of FIG. 25, all the subpixel electrodes 230 are provided on the TFT substrate 2, as illustrated in a portion B of FIG. 25. On the other hand, for example, with respect to the subpixel electrodes 230 formed by dividing the pixel electrode denoted by a reference sign 23c in the portion A of FIG. 25, some of the subpixel electrodes 230 are provided on the TFT substrate 2, but the remaining subpixel electrodes 230 are not provided on the TFT substrate 2, as illustrated in the portion B of FIG. 25. By adopting such a configuration, an increase in the size of the protruding region is suppressed. As can be seen from FIGS. 24 and 25, each of the subpixel electrodes 230 has a rectangular shape, and all the subpixel electrodes 230 have the same size.

As described above, in the present embodiment, the plurality of subpixel electrodes 230 are formed on the TFT substrate 2. Further, each of the pixels is formed as follows, where K is an integer of 2 or more. In the boundary portion between the active area 6 and the frame region 7, each of the pixels is formed by one of the subpixel electrodes 230 or by two or more and K or fewer of the subpixel electrodes 230, electrically connected to each other. In the region of the active area 6 other than the boundary portion, each of the pixels is formed by the K subpixel electrodes 230 electrically connected to each other.

3.2 Detailed Structure of Region in Which Subpixel Electrodes Are Formed

Figure 26:
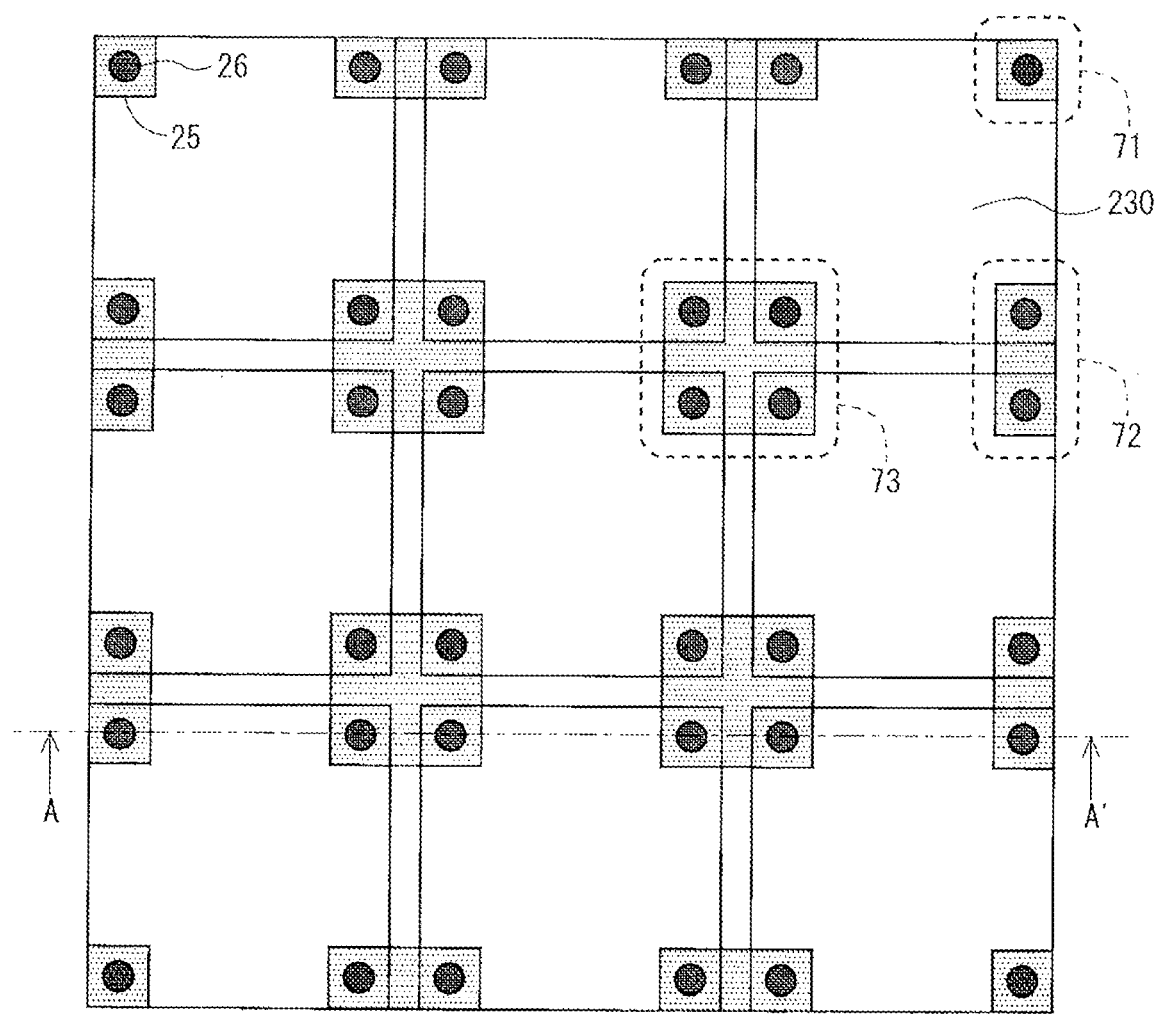
FIG. 26 is a plan view for describing a detailed configuration of a region in which the subpixel electrodes are formed, according to the third embodiment.
Figure 27:
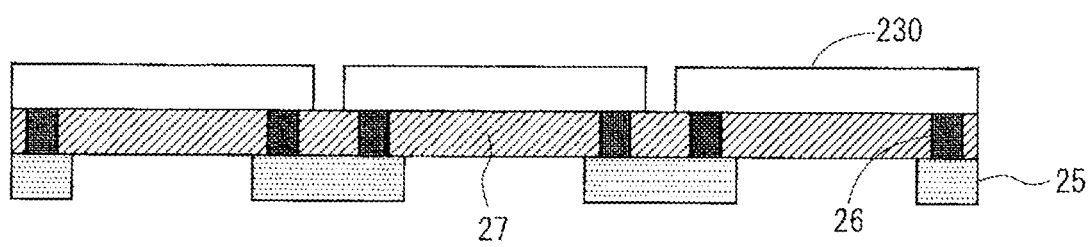
FIG. 27 is a schematic cross-sectional view taken along a line A-A' in FIG. 26.

FIG. 26 is a plan view for describing a detailed configuration of a region in which the subpixel electrodes 230 are formed, and FIG. 27 is a schematic cross-sectional view taken along a line A-A' in FIG. 26. Here, attention is paid to an example in which the one pixel electrode 23 is divided into nine (3×3) of the subpixel electrodes 230.

In the present embodiment, as illustrated in FIG. 27, connection electrodes 25 are provided in a lower layer than the subpixel electrodes 230. The connection electrodes 25 are electrodes for electrically connecting, to each other, the nine subpixel electrodes 230 formed by dividing the pixel electrode 23. An insulating film 27 is provided between the subpixel electrodes 230 and the connection electrodes 25. As illustrated in FIG. 26, each of the subpixel electrodes 230 is connected to four of the connection electrodes 25 via respective contact holes 26. In other words, each of four vertices of each of the subpixel electrodes 230 is electrically connected to the corresponding connection electrode 25 via the contact hole 26. In this way, in order to electrically connect each of the subpixel electrodes 230 and the corresponding connection electrode 25, the contact hole 26 is formed so as to penetrate the insulating film 27. Further, for example, the connection electrode 25 in a dotted line portion denoted by a reference sign 71 in FIG. 26 is connected to only one of the subpixel electrodes 230, the connection electrode 25 in a dotted line portion denoted by a reference sign 72 in FIG. 26 is connected to two of the subpixel electrodes 230, and the connection electrode 25 in a dotted line portion denoted by a reference sign 73 in FIG. 26 is connected to four of the subpixel electrodes 230. As described above, in the present embodiment, there are the connection electrode 25 connected to only one of the subpixel electrodes 230, the connection electrode 25 connected to two of the subpixel electrodes 230, and the connection electrode 25 connected to four of the subpixel electrodes 230.

Note that, in the present embodiment, the above-described wiring electrode 24 (not illustrated in FIGS. 26 and 27) is connected to any one of the nine subpixel electrodes 230 via the contact hole 26. Since the nine subpixel electrodes 230 are electrically connected to each other by the connection electrodes 25, when a voltage (the white display voltage VA or the black display voltage VB) corresponding to the data signal BOUT is applied to any one of the subpixel electrodes 230 via the wiring electrode 24, the voltage is applied to the nine subpixel electrodes 230. However, the disclosure is not limited to such a configuration, and a configuration can be adopted in which the drive circuit 40 and the polarity switching circuit 50 are provided in the active area 6 so that a voltage corresponding to the data signal BOUT is applied to any one of the nine subpixel electrodes 230.

3.3 Specific Example of Protruding Region

Figure 28:
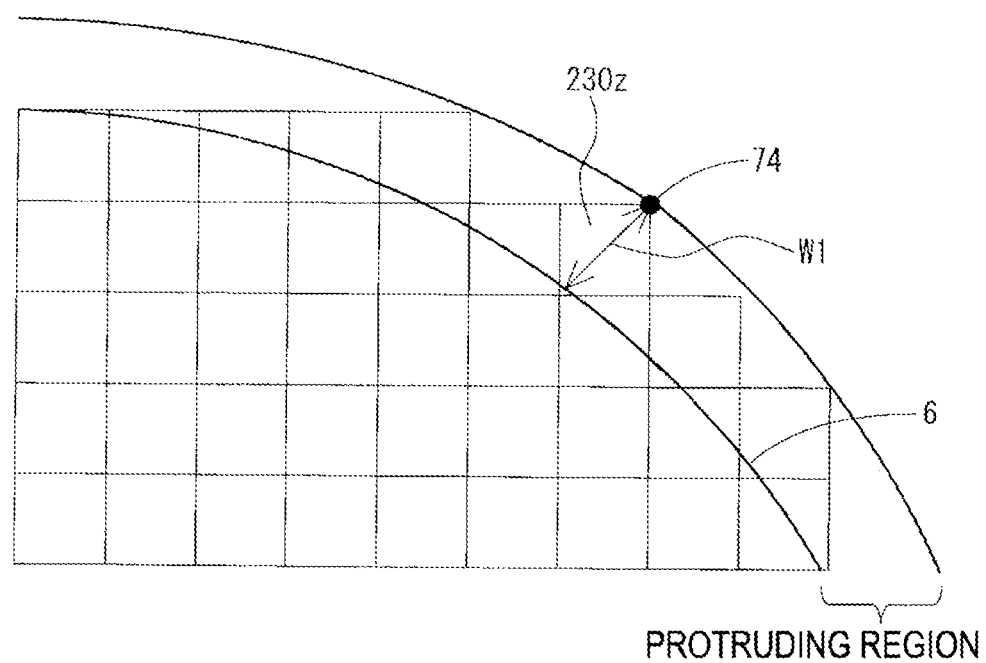
FIG. 28 is a diagram for describing a specific example of a protruding region, according to the third embodiment.

In the example of the above-described first embodiment, the pixel pitch is 1.2 mm, the pixel size is 1.195 mm×1.195 mm, and the diameter of the active area 6 is 33.6 mm (i.e., the radius thereof is 16.8 mm). Here, it is assumed that the pixel electrodes 23 in this example are divided so that the subpixel pitch is 0.1 mm and the subpixel size is 0.095 mm×0.095 mm. In this case, the one pixel electrode 23 is divided into 144 (12×12) of the subpixel electrodes 230. At this time, when the position (a position denoted by a reference sign 74 in FIG. 28) farthest from the center of the active area 6, in the region in which the subpixel electrode (a subpixel electrode denoted by a reference sign 230z in FIG. 28) located farthest from the center of the active area 6 is formed, is defined as an "outermost subpixel position", the distance from the center of the active area 6 to the outermost subpixel position is 16.9 mm. Since the radius of the active area 6 is 16.8 mm, a width W1 of the protruding region is 0.1 mm.

Note that the width of the protruding region does not exceed a diagonal dimension of the subpixel electrode 230. Therefore, the actual subpixel size may be determined on the basis of an allowable width as the width of the protruding region.

3.4 Effects

According to the present embodiment, the pixel electrodes 23 forming each of the pixels are divided into the plurality of subpixel electrodes 230 that are electrically connected to each other. Only the subpixel electrodes 230 having at least a portion included in the active area 6 are provided on the TFT substrate 2, and the subpixel electrodes 230 entirely included in the frame region 7 are not provided on the TFT substrate 2. By adopting such a configuration, the protruding region can be made significantly smaller. Further, since the size of all the subpixel electrodes 230 provided on the TFT substrate 2 is the same, a luminance difference or deterioration of the liquid crystal, due to a difference in the magnitude of the feed-through voltage between the subpixels, do not occur. As described above, according to the present embodiment also, in the liquid crystal display device including the circular active area (display region) 6, the frame narrowing is realized without causing a deterioration in the display quality and reliability.

3.5 Modified Example

In the above-described third embodiment, among the plurality of subpixel electrodes 230 obtained by dividing the pixel electrode 23 forming each of the pixels, all the subpixel electrodes 230 having at least a portion included in the active area 6 are provided on the TFT substrate 2. On the other hand, in a present modified example, among the plurality of subpixel electrodes 230 obtained by dividing the pixel electrode 23 forming each of the pixels, only the subpixel electrodes 230 having a portion having a predetermined area or greater included in the active area 6 are provided on the TFT substrate 2.

Figure 29:
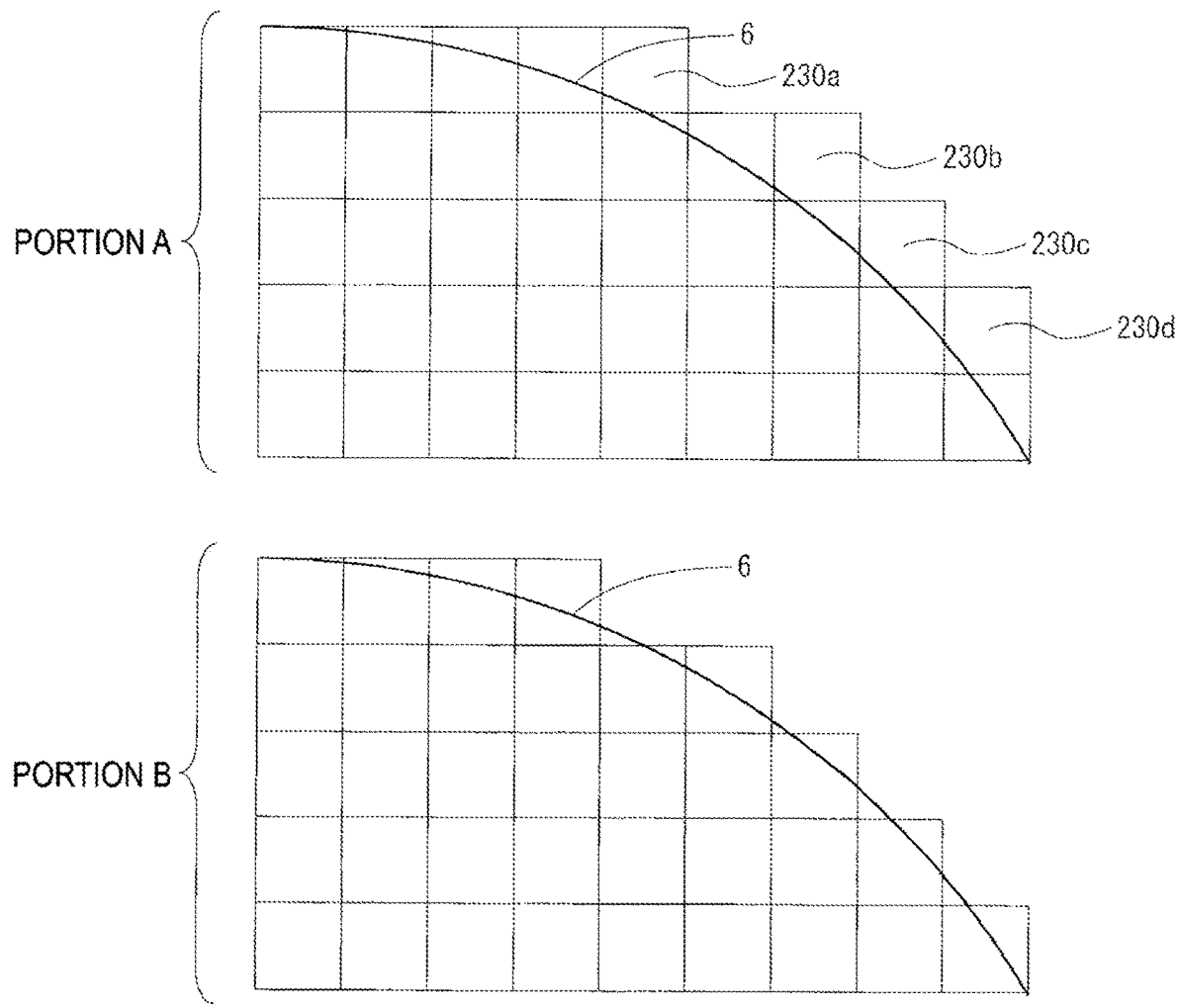
FIG. 29 is a diagram for describing the subpixel electrodes provided on the TFT substrate, according to a modified example of the third embodiment.

With respect to a case in which the configuration of the above-described third embodiment is adopted and a state illustrated in a portion A of FIG. 29 is obtained, when the configuration of the present modified example is adopted, a state illustrated in a portion B of FIG. 29 is obtained. The subpixel electrodes denoted by reference signs 230a, 230b, 230c, and 230d in the portion A of FIG. 29 are not present in the portion B of FIG. 29. As described above, in the present modified example, the subpixel electrodes 230 having a portion included in the active area 6 having an area that is less than the predetermined area are not provided on the TFT substrate 2.

4. Fourth Embodiment

A fourth embodiment will be described below. Note that the configuration relating to the driving of the wiring electrode 24 is the same as that of the first embodiment described above.

4.1 Schematic Configuration of Liquid Crystal Display Device

Liquid crystal display devices can be largely classified into transmissive liquid crystal display devices that utilize light emitted from a backlight provided on the back face of a display portion, and reflective liquid crystal display devices that utilize reflected external light. However, in recent years, a dual-layer structure display device (hereinafter referred to as a dual-layer display) has been developed in which an organic EL display device is provided on the back face of the reflective liquid crystal display device. The dual-layer display is typically adopted in a wristwatch, and in the dual-layer display, for example, when high-definition display is performed, image display is performed by the organic EL display device, and when simple display such as display of character information is performed, image display is performed by the reflective liquid crystal display device. The display device according to the present embodiment is such a dual-layer display.

Figure 30:
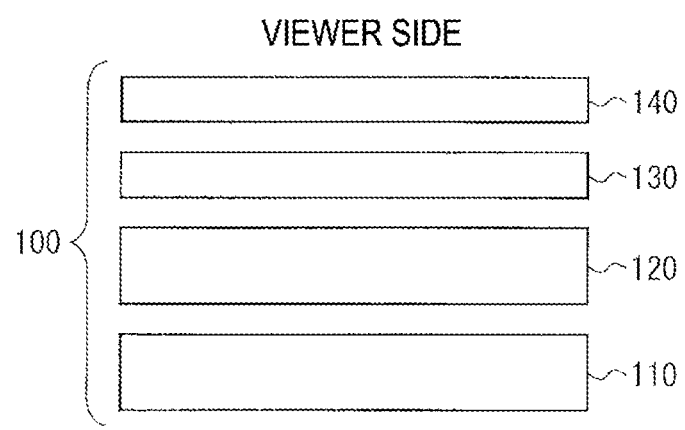
FIG. 30 is a schematic diagram for describing a schematic configuration of a display device, according to a fourth embodiment.

FIG. 30 is a schematic diagram for describing a schematic configuration of a display device (a dual-layer display) 100 according to the present embodiment. As illustrated in FIG. 30, the display device 100 is constituted by a polarizer 140, a phase difference plate 130, a liquid crystal display device 120, and an organic EL display device 110. As illustrated in FIG. 30, these constituent elements are arranged in the order of the polarizer 140, the phase difference plate 130, the liquid crystal display device 120, and the organic EL display device 110 from the side of a viewer. The polarizer 140 may be of an absorption type, or may be of a reflective type. The liquid crystal display device 120 is a reflective liquid crystal display device, and the cell thickness of the liquid crystal display device 120 is approximately half the cell thickness of a typical transmissive liquid crystal display device. The organic EL display device 110 includes a reflective layer. Note that the phase difference plate 130 is provided for optical compensation or expansion of the viewing angle, but a configuration in which the phase difference plate 130 is not provided can also be employed.

In the configuration described above, when high-definition display is performed, image display is performed by the organic EL display device 110 with all pixels of the liquid crystal display device 120 in a transmissive state. On the other hand, when simple display such as display of character information is performed, image display is performed by the liquid crystal display device 120 utilizing reflected external light reflected by the reflective layer of the organic EL display device 110.

As described above, the disclosure relates to the liquid crystal display device including the non-rectangular display region (active area 6), and an object thereof is to realize frame narrowing without causing a deterioration in display quality and reliability. Thus, in the following description, only the liquid crystal display device 120 will be described.

4.2 Detailed Structure of Region in Which Subpixel Electrodes are Formed

In the present embodiment, as in the above-described third embodiment, the pixel electrode 23 forming each of the pixels is divided into the plurality of subpixel electrodes 230 that are electrically connected to each other (see FIG. 24). Further, with respect to the plurality of subpixel electrodes 230 obtained by dividing the pixel electrode 23, only the subpixel electrodes 230 having at least a portion included in the active area 6 are provided on the TFT substrate 2, and the subpixel electrodes 230 entirely included in the frame region 7 are not provided on the TFT substrate 2 (see FIG. 25).

Figure 31:
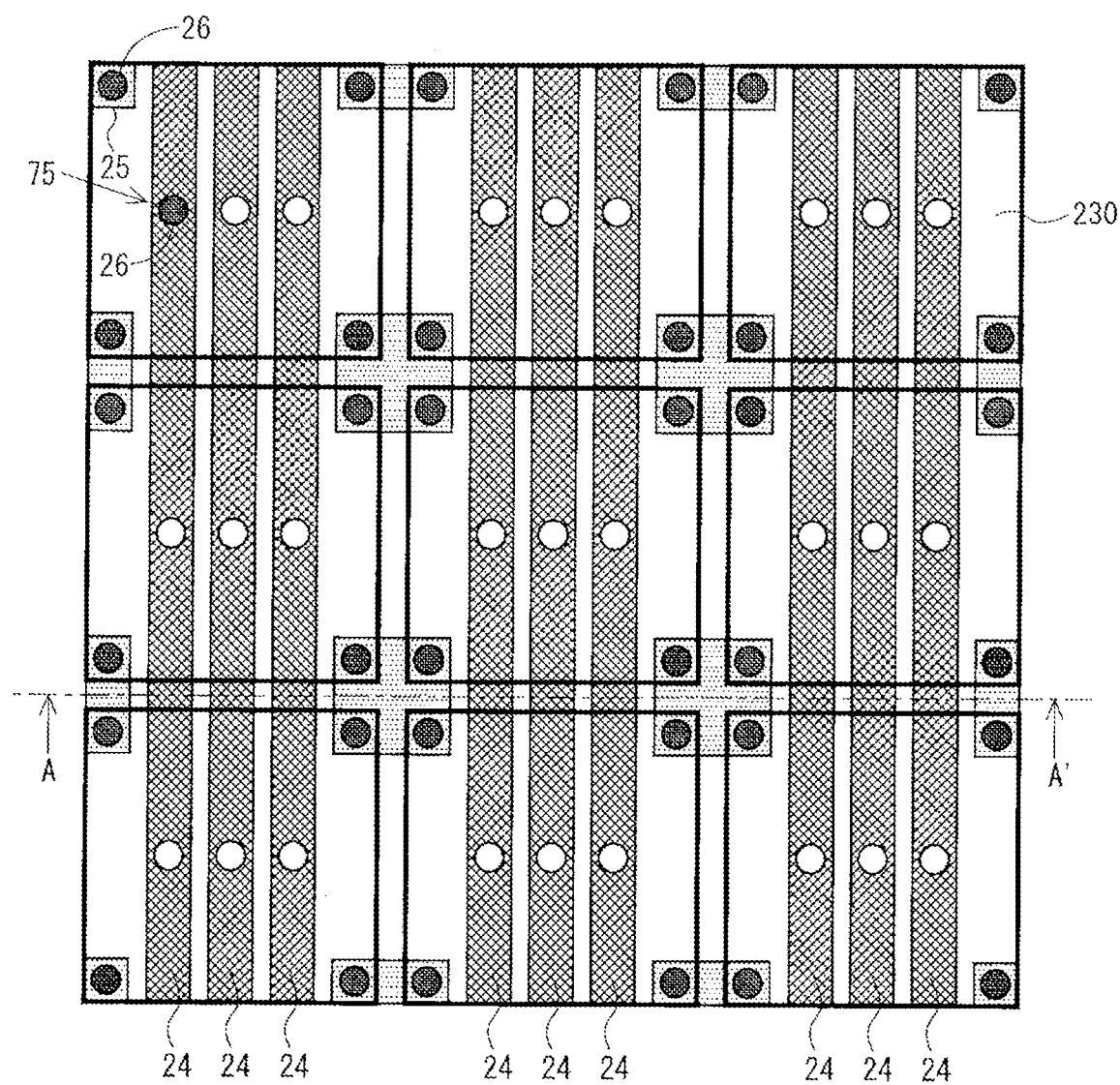
FIG. 31 is a plan view for describing a detailed configuration of a region in which the subpixel electrodes are formed according to the fourth embodiment.
Figure 32:
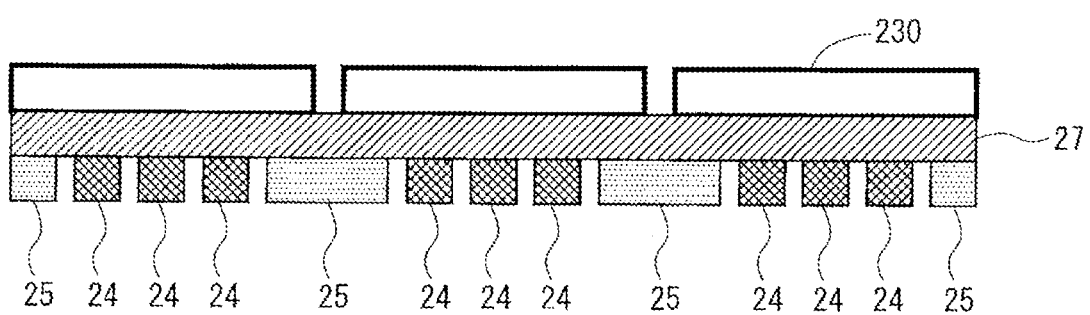
FIG. 32 is a schematic cross-sectional view taken along a line A-A' in FIG. 31.

FIG. 31 is a plan view for describing a detailed structure of a region in which the subpixel electrodes 230 are formed, and FIG. 32 is a schematic cross-sectional view taken along a line A-A' in FIG. 31. Note that, in this case also, attention is paid to an example in which the one pixel electrode 23 is divided into nine (3×3) of the subpixel electrodes 230. Similarly to the third embodiment, in the present embodiment also, the connection electrodes 25 are provided in the lower layer than the subpixel electrodes 230, and each of the subpixel electrodes 230 is connected to four of the connection electrodes 25 via the respective contact holes 26. Further, in the present embodiment, the above-described wiring electrodes 24 are provided in the lower layer than the subpixel electrodes 230. One of the nine subpixel electrodes 230 is connected to any of the wiring electrodes 24 via the contact hole 26 (see a portion indicated by an arrow denoted by the reference sign 75 in FIG. 31). The connection electrodes 25 and the wiring electrodes 24 are formed in the same layer. The insulating film 27 is provided between the subpixel electrodes 230 and the connection electrodes 25 and between the subpixel electrodes 230 and the wiring electrodes 24.

Here, since the reflective liquid crystal display device utilizes the reflected external light, if the aperture ratio of the active area 6 is low, a sufficient display quality cannot be obtained. Therefore, the aperture ratio is preferably increased as much as possible. Here, in the present embodiment, the subpixel electrodes 230 and the wiring electrodes 24 are formed of a transparent conductive material. That is, the subpixel electrodes 230 and the wiring electrodes 24 are so-called transparent electrodes. Further, in order to obtain a sufficient aperture ratio in the active area 6, the drive circuit 40 and the polarity switching circuit 50 are provided in the frame region 7, as in the first embodiment.

4.3 Effects

According to the present embodiment, in the dual-layer display including the non-rectangular active area 6, the frame narrowing is realized without causing a deterioration in the display quality and reliability.

5. Fifth Embodiment

A fifth embodiment will be described.

5.1 Overview

In the present embodiment, as in the above-described third embodiment, the pixel electrode 23 forming each of the pixels is divided into the plurality of subpixel electrodes 230 that are electrically connected to each other (see FIG. 24). Further, with respect to the plurality of subpixel electrodes 230 obtained by dividing the pixel electrode 23, only the subpixel electrodes 230 having at least a portion included in the active area 6 are provided on the TFT substrate 2, and the subpixel electrodes 230 entirely included in the frame region 7 are not provided on the TFT substrate 2 (see FIG. 25).

Figure 33:
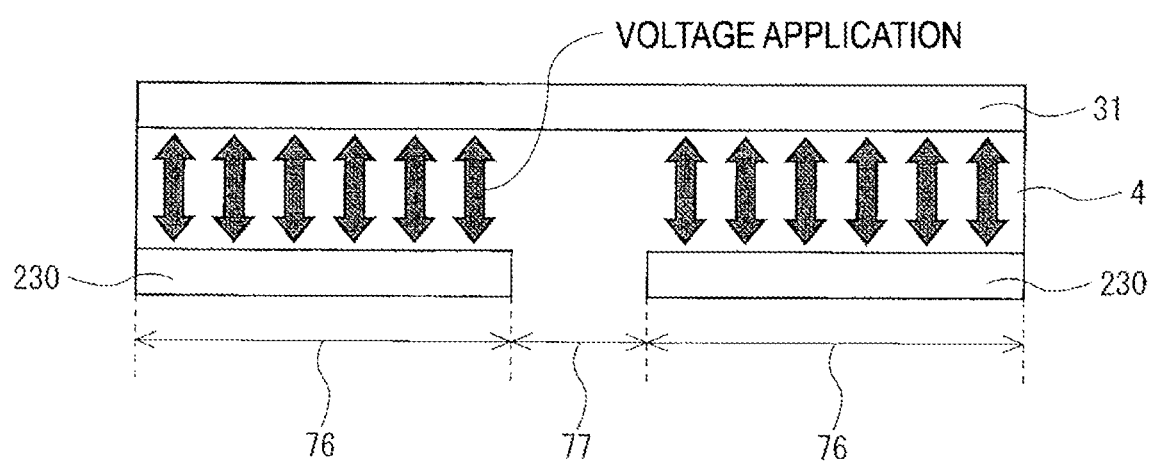
FIG. 33 is a diagram for describing the overview of a fifth embodiment.

Incidentally, a gap portion is inevitably generated between two of the adjacent subpixel electrodes 230, and the gap portion may be visually recognized as a lattice pattern by a viewer. This will be described with reference to FIG. 33. At a portion (hereinafter referred to as a "subpixel electrode portion") 76 at which the subpixel electrode 230 is formed, a common electrode 31 and the subpixel electrode 230 face each other with the liquid crystal 4 interposed therebetween, and thus the voltage is applied. On the other hand, in a gap portion 77, since the subpixel electrode 230 is not present at a position facing the common electrode 31, no voltage is applied. Therefore, in a state in which the voltage is applied to the subpixel electrodes 230, the state of the liquid crystal 4 may be different between the subpixel electrode portions 76 and the gap portions 77. When the state of the liquid crystal 4 is different between the subpixel electrode portions 76 and the gap portions 77, reflective display is performed at the subpixel electrode portions 76 while transmissive display is performed at the gap portions 77, for example. When such a display is performed, the gap portions 77 may be visually recognized as the lattice pattern by the viewer. Here, in the present embodiment, the connection electrodes 25 are also formed at the gap portions 77 so that the state of the liquid crystal 4 at the subpixel electrode portions 76 is the same as the state of the liquid crystal 4 at the gap portions 77.

5.2 Detailed Structure of Region in Which Subpixel Electrodes are Formed

Figure 34:
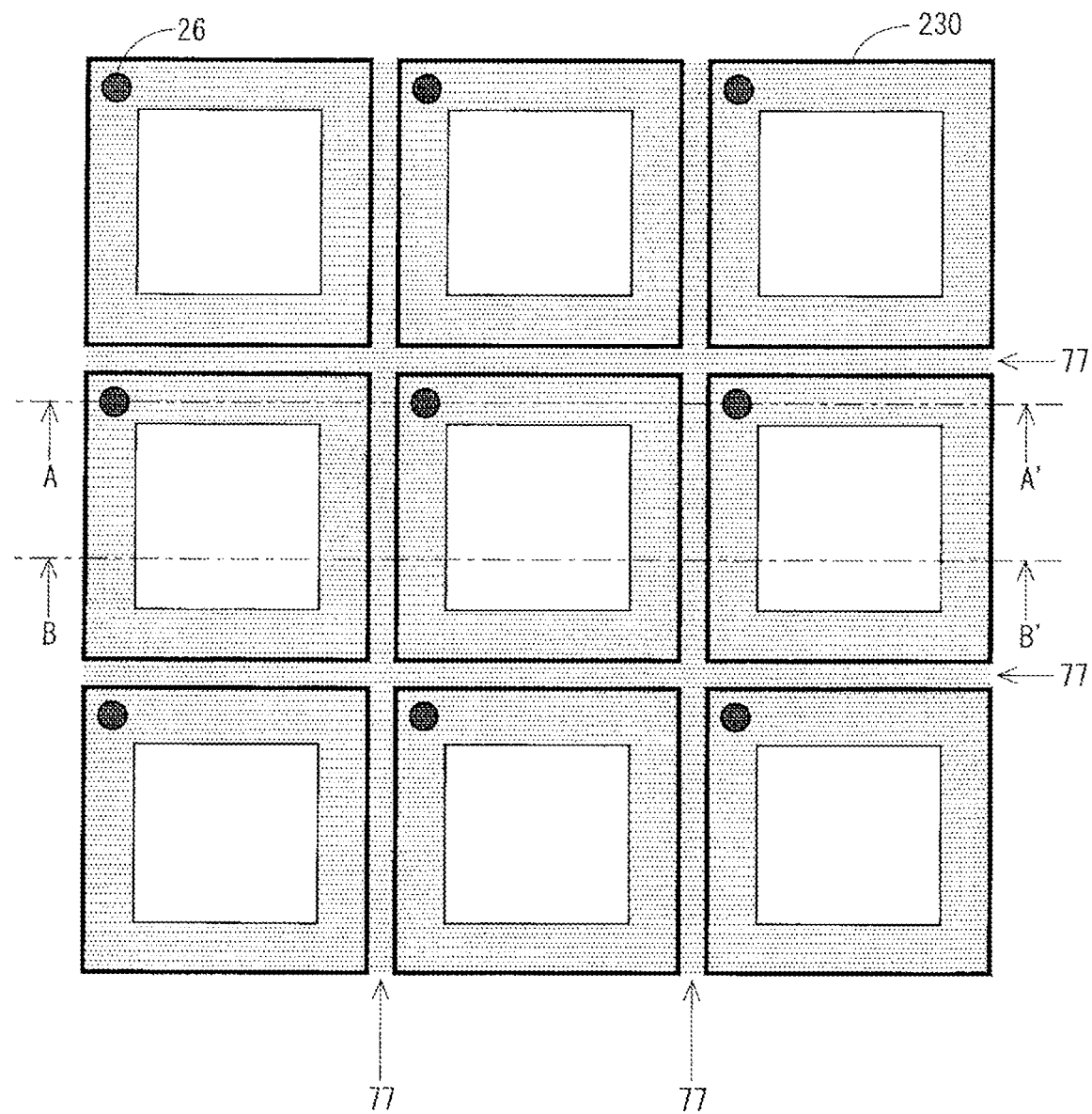
FIG. 34 is a plan view for describing a detailed configuration of a region in which the subpixel electrodes are formed according to the fifth embodiment.
Figure 35:
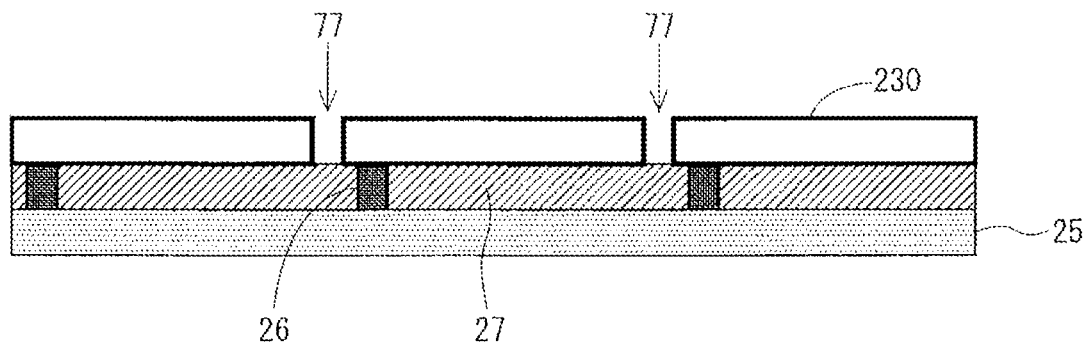
FIG. 35 is a schematic cross-sectional view taken along a line A-A' in FIG. 34.
Figure 36:
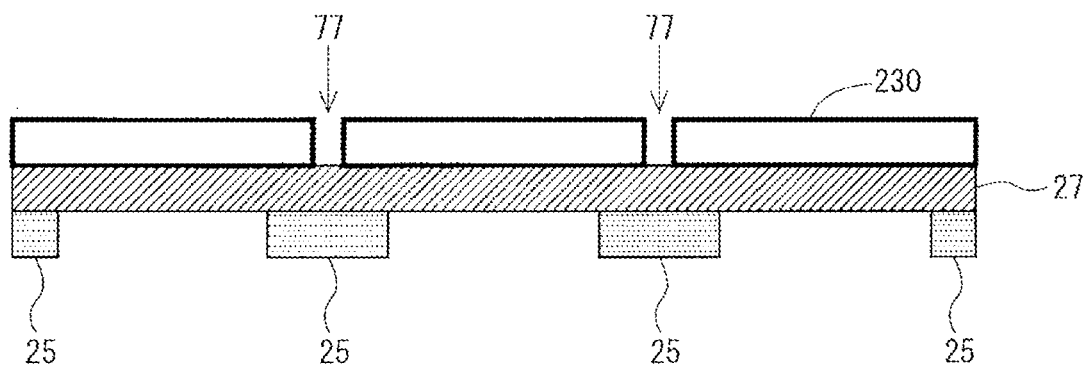
FIG. 36 is a schematic cross-sectional view taken along a line B-B' in FIG. 34.
Figure 37:
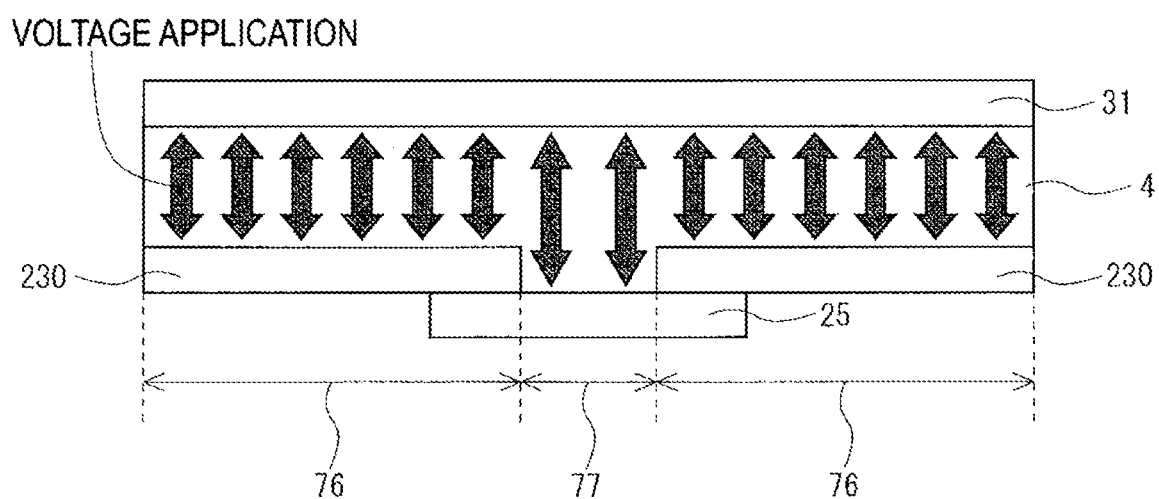
FIG. 37 is a diagram for describing application of a voltage between a connection electrode and a common electrode at a gap portion, according to the fifth embodiment.

FIG. 34 is a plan view for describing a detailed structure of a region in which the subpixel electrodes 230 are formed, FIG. 35 is a schematic cross-sectional view taken along a line A-A' in FIG. 34, and FIG. 36 is a schematic cross-sectional view taken along a line B-B' in FIG. 34. It is understood from FIGS. 34, 35, and 36 that the connection electrodes 25 are provided in the lower layer than the subpixel electrodes 230 so that the voltage is also applied to the gap portions 77. Specifically, the connection electrodes 25 are provided so that the common electrode 31 and the connection electrodes 25 face each other over the entire gap portion between the two adjacent subpixel electrodes 230. The insulating film 27 is provided between the subpixel electrodes 230 and the connection electrodes 25, and each of the subpixel electrodes 230 is connected to the connection electrode 25 via the contact holes 26 formed penetrating the insulating film 27. The connection electrodes 25 contribute to electrically connecting the nine subpixel electrodes 230 to each other. Further, as schematically illustrated in FIG. 37, the voltage is applied between the subpixel electrodes 230 and the common electrode 31 at the subpixel electrode portions 76, and the voltage is applied between the connection electrode 25 and the common electrode 31 at the gap portion 77. In this way, the connection electrodes 25 also contribute to causing the state of the liquid crystal 4 at the subpixel electrode portions 76 and the state of the liquid crystal 4 at the gap portions 77 to be the same as each other. Furthermore, by forming the subpixel electrodes 230 and the connection electrodes 25 using a transparent conductive material (i.e., by adopting transparent electrodes as the subpixel electrodes 230 and the connection electrodes 25), the aperture ratio of the active area 6 can be increased.

In the present embodiment, for example, the drive circuit 40 and the polarity switching circuit 50 are provided in the active area 6, and the voltage (the white display voltage VA or the black display voltage VB) corresponding to the data signal BOUT is applied to any one of the nine subpixel electrodes 230.

5.3 Effects

According to the present embodiment, the connection electrodes 25 for electrically connecting the plurality of subpixel electrodes 230 to each other are also formed at the gap portions 77 inevitably generated as a result of dividing the pixel electrode 23 forming each of the pixels into the plurality of subpixel electrodes 230. Therefore, the application of the voltage is performed in the same manner at the subpixel electrode portions 76 and at the gap portions 77, and the state of the liquid crystal 4 at the subpixel electrode portions 76 and the state of the liquid crystal 4 at the gap portions 77 can be caused to be the same. As a result, the gap portions 77 are prevented from being visually recognized as the lattice pattern by the viewer. Further, effects similar to those of the above-described third embodiment can also be obtained. As described above, with respect to the liquid crystal display device including the circular active area (display region) 6, the frame narrowing can be realized while securing a remarkably good display quality.

5.4 Modified Examples

Modified examples of the above-described fifth embodiment will be described below.

5.4.1 First Modified Example

Figure 38:
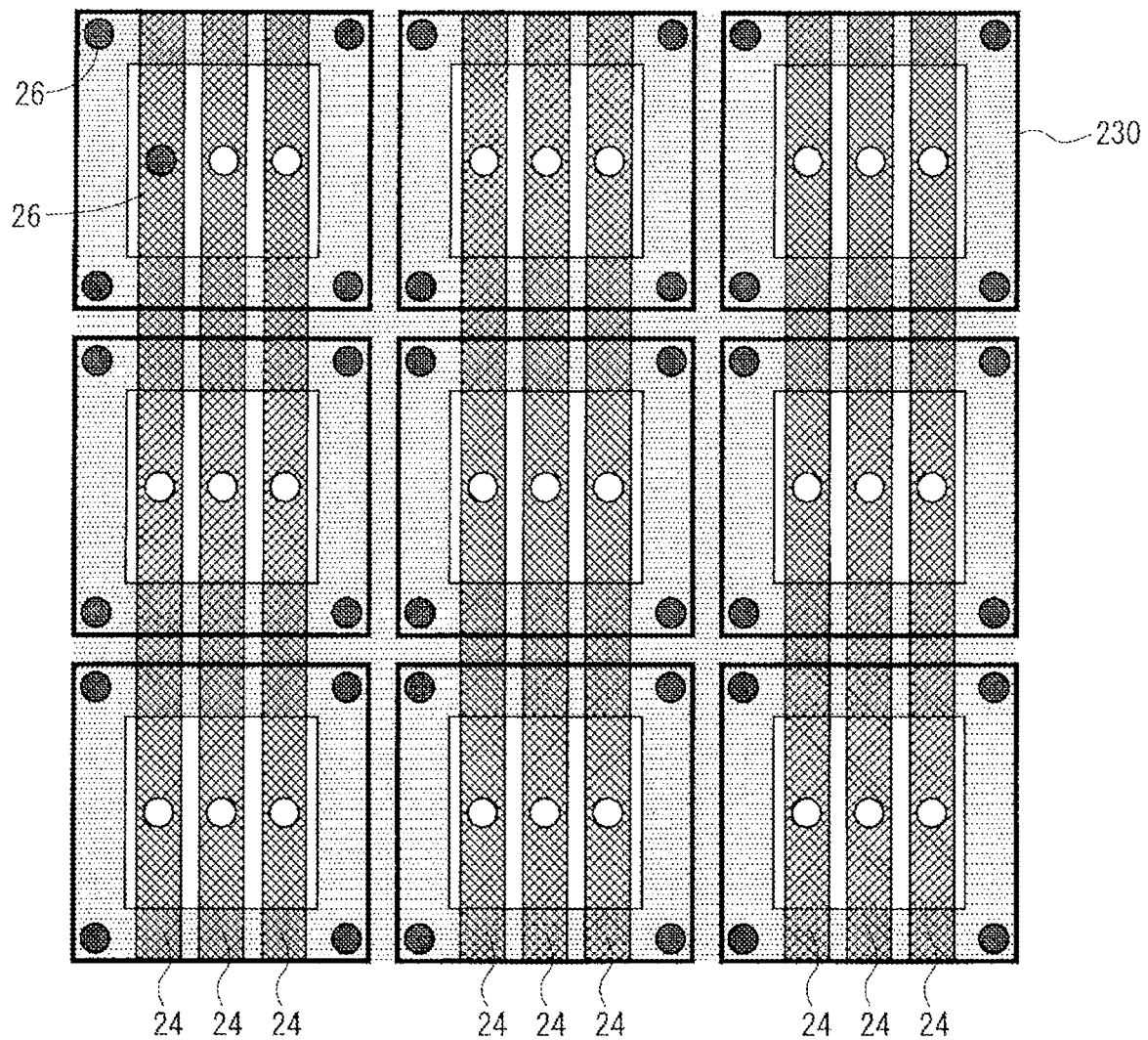
FIG. 38 is a plan view for describing a detailed configuration of a region in which the subpixel electrodes are formed, according to a first modified example of the fifth embodiment.
Figure 39:
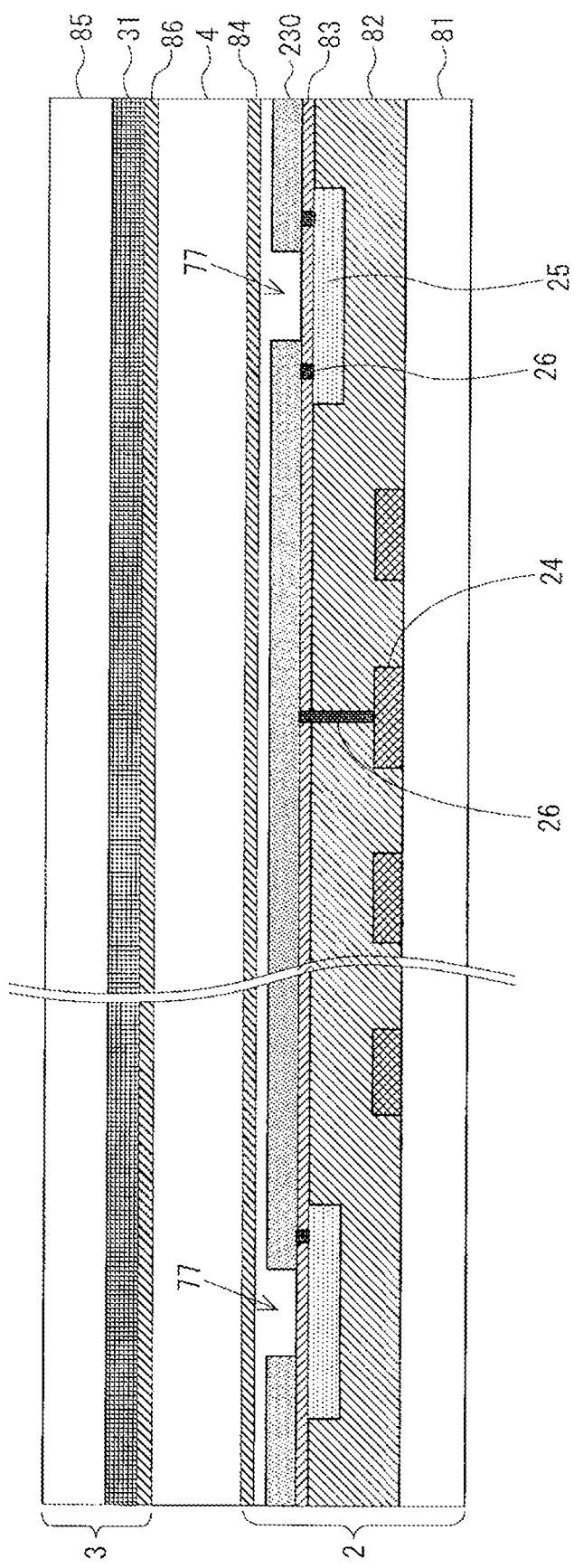
FIG. 39 is a partial cross-sectional view of the liquid crystal display device according to the first modified example of the fifth embodiment.

FIG. 38 is a plan view for describing a detailed configuration of a region in which the subpixel electrodes 230 are formed according to the present modified example. FIG. 39 is a partial cross-sectional view of the liquid crystal display device according to the present modified example. In this modified example, a configuration is adopted in which the above-described fourth embodiment and the above-described fifth embodiment are combined. In other words, the wiring electrodes 24 are provided in addition to the connection electrodes 25 in the lower layer than the subpixel electrodes 230, as in the fourth embodiment, and the connection electrodes 25 are also formed in the gap portions 77, as in the fifth embodiment. However, unlike in the fourth embodiment, the connection electrodes 25 and the wiring electrodes 24 are formed in different layers.

In the present modified example, as illustrated in FIG. 39, the wiring electrodes 24 are formed on a glass substrate 81 constituting the TFT substrate 2, and a JAS film 82 as an insulating film is formed so as to cover the wiring electrodes 24. The thickness of the JAS film 82 is 2 µm, for example. The connection electrodes 25 are formed on portions of the surface of the JAS film 82 corresponding to the gap portions 77, and a nitride film 83 as an insulating film is formed so as to cover the JAS film 82 and the connection electrodes 25. A thickness of the nitride film is 100 nm, for example. The subpixel electrodes 230 are formed on the nitride film 83, and a polyimide alignment film 84 is formed so as to cover the subpixel electrodes 230. Furthermore, the contact holes 26 for electrically connecting the subpixel electrodes 230 and the connection electrodes 25 and the contact holes 26 for electrically connecting the subpixel electrodes 230 and the wiring electrodes 24 are formed. Further, the common electrode 31 is formed on a glass substrate 85 constituting the counter substrate 3, and a polyimide alignment film 86 is formed so as to cover the common electrode 31.

As described above, even when the configuration is adopted in which the wiring electrodes 24 are formed in the lower layer than the subpixel electrodes 230, the gap portions 77 can be prevented from being visually recognized as the lattice pattern by the viewer, by forming the connection electrodes 25 at the gap portions 77 inevitably generated as a result of dividing the pixel electrode 23 into the plurality of subpixel electrodes 230.

5.4.2 Second Modified Example

Figure 40:
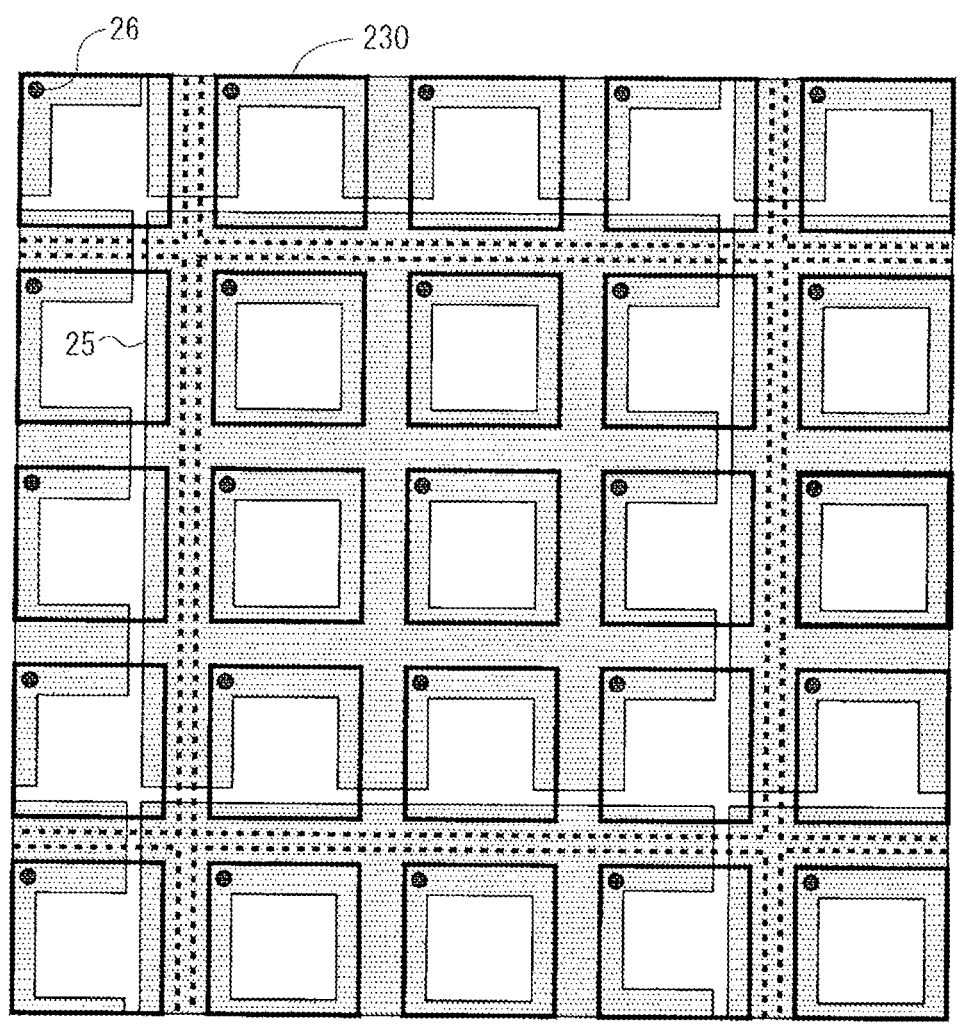
FIG. 40 is a plan view for describing a detailed configuration of a region in which the subpixel electrodes are formed, according to a second modified example of the fifth embodiment.

FIG. 40 is a plan view for describing a detailed configuration of a region in which the subpixel electrodes 230 are formed according to the present modified example. In FIG. 40, regions indicated by rectangular thick dotted lines are regions in which the pixels are formed. As illustrated in FIG. 40, in the present modified example, the connection electrode 25 is provided so that the common electrode 31 and the connection electrode 25 face each other over the entire gap portion 77 between the two adjacent subpixel electrodes 230 and over the entire gap portion 77 between two of the adjacent pixels. Therefore, in addition to the gap portion 77 between the two adjacent subpixel electrodes 230, the voltage is also applied to the gap portion 77 between the two adjacent pixels in the same manner as at the subpixel electrode portion 76. Accordingly, the gap portions 77 can be more effectively inhibited from being visually recognized as the lattice pattern by the viewer.

6. Additional Remarks

Although the disclosure has been described in detail above, the above description is exemplary in all respects and is not limited thereto. It is understood that numerous other modifications or variations can be made without departing from the scope of the disclosure.

For example, the content of the above-described disclosure can also be applied to a case in which a static drive is adopted, in which one of two or more segment voltages is applied to each of a plurality of segment electrodes in accordance with display content.

Further, although the liquid crystal display device including the circular active area 6 is described as an example in each of the above-described embodiments, the content of the above-described disclosure can also be applied to a liquid crystal display device including the non-rectangular active area 6 other than the circular active area 6.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a display region having a non-rectangular shape, the liquid crystal display device comprising:
   a first substrate including a plurality of pixel electrodes, each forming one pixel, and a plurality of wiring electrodes, each configured to be connected to a respective one of the plurality of pixel electrodes;
   a second substrate including a common electrode provided facing the plurality of pixel electrodes; and
   a liquid crystal provided between the plurality of pixel electrodes and the common electrode,
   wherein a voltage is always applied to the plurality of pixel electrodes, via the plurality of wiring electrodes, from outside the display region, and
   among the plurality of pixel electrodes, a size of a pixel electrode located at a boundary portion between the display region and a frame region is smaller than a size of a pixel electrode not located at the boundary portion, the frame region being a region outside the display region.

2. The liquid crystal display device according to claim 1, wherein the pixel electrode located at the boundary portion has a shape obtained by removing a portion included in the frame region from a shape of a normal pixel electrode, the entire pixel electrode being entirely included in the display region.

3. The liquid crystal display device according to claim 1, wherein a light blocking film is provided on the second substrate at least at or near the boundary portion in the frame region, and
at least a set of the plurality of pixel electrodes located at the boundary portion comprises a portion included in the display region and a portion included in a region, of the frame region, where the light blocking film is provided.

4. The liquid crystal display device according to claim 3, wherein an outer edge of the display region forms an arc in a region where the set of the plurality of pixel electrodes located at the boundary portion is provided,
each of the set of the plurality of pixel electrodes located at the boundary portion has a shape of an N-sided polygon having one side that is a tangent line of the arc, where N is an integer in a range from 3 to 5.

5. The liquid crystal display device according to claim 3, wherein, of each of the set of the plurality of pixel electrodes located at the boundary portion, a portion included in the frame region has a stepped shape in a plan view.

6. The liquid crystal display device according to claim 1, wherein the first substrate further includes:
a plurality of pixel transistors having a one-to-one correspondence with the plurality of pixel electrodes,
a drive circuit configured to drive the plurality of pixel transistors and provided in the frame region, and
a polarity switching circuit configured to switch, at a predetermined interval, a polarity of the voltage applied to the plurality of pixel electrodes, the polarity switching circuit being provided in the frame region and including the plurality of pixel transistors, wherein:
each of the plurality of wiring electrodes is further configured to be connected to a respective one of the plurality of pixel transistors,
the drive circuit includes a shift register formed by a plurality of unit circuits connected in series,
the plurality of unit circuits outputs, as a plurality of timing signals, a plurality of output signals becoming sequentially active,
capturing of a plurality of data signals is performed based on the plurality of timing signals,
the drive circuit further includes M latch circuits for each one of the plurality of timing signals, where M is an integer of 2 or more,
the M latch circuits capture M data signals among the plurality of data signals based on corresponding timing signals among the plurality of timing signals, and output the captured M data signals,
the polarity switching circuit is formed by a plurality of polarity control units corresponding to the plurality of wiring electrodes, respectively,
each of the plurality of polarity control units includes a first pixel transistor and a second pixel transistor, an on/off state of the first pixel transistor and the second pixel transistor changing in a mutually inverted manner based on a data signal among the plurality of data signals output from a corresponding latch circuit among the M latch circuits,
a first voltage and a second voltage are applied to each of the plurality of polarity control units, a voltage level of the first voltage and the second voltage changing in a mutually inverted manner between a first level and a second level at the predetermined interval,
when the first pixel transistor is in an on state, the first voltage is applied to a corresponding pixel electrode among the plurality of the pixel electrodes via a corresponding wiring electrode among the plurality of the wiring electrodes, and
when the second pixel transistor is in an on state, the second voltage is applied to the corresponding pixel electrode via the corresponding wiring electrode.

7. The liquid crystal display device according to claim 1, wherein the display region has a circular shape.

8. A liquid crystal display device including a display region having a non-rectangular shape, the liquid crystal display device comprising:
a first substrate including a plurality of subpixel electrodes having a same size and a plurality of wiring electrodes, each configured to be connected to a respective one of a plurality of pixels formed by the plurality of subpixel electrodes;
a second substrate including a common electrode provided facing the plurality of subpixel electrodes; and
a liquid crystal provided between the plurality of subpixel electrodes and the common electrode,
wherein, in a boundary portion between the display region and a frame region being a region outside the display region, each of the plurality of pixels is formed by one subpixel electrode among the plurality of subpixel electrodes or by two or more and K or fewer subpixel electrodes electrically connected to each other among the plurality of subpixel electrodes, the one subpixel electrode comprising at least a portion included in the display region, and the two or more and K or fewer subpixel electrodes each comprising at least a portion included in the display region,
in a region, of the display region, other than the boundary portion, each of the plurality of pixels is formed by K subpixel electrodes electrically connected to each other among the plurality of subpixel electrodes, where K is an integer having a value of 2 or more, and
a voltage is always applied to each of the plurality of subpixel electrodes, via a corresponding wiring electrode among the plurality of wiring electrodes, from outside the display region.

9. The liquid crystal display device according to claim 8, wherein the first substrate further includes:
one or more connection electrodes configured to electrically connect, to each other, K or fewer subpixel electrodes forming each of the plurality of pixels among the plurality of subpixel electrodes,
an insulating film formed between the plurality of subpixel electrodes and the one or more connection electrodes, and
a contact hole formed penetrating the insulating film to electrically connect each of the plurality of subpixel electrodes and a corresponding connection electrode among the one or more connection electrodes.

10. The liquid crystal display device according to claim 9, wherein the plurality of wiring electrodes is formed in a same layer as the one or more connection electrodes, and
a voltage corresponding to a data signal is applied to one of the K or fewer subpixel electrodes forming each of the plurality of pixels via the corresponding wiring electrode among the plurality of wiring electrodes.

11. The liquid crystal display device according to claim 10,
wherein the plurality of subpixel electrodes and the plurality of wiring electrodes are formed by a transparent conductive material.

12. The liquid crystal display device according to claim 9,
wherein each of the plurality of subpixel electrodes has a rectangular shape, and
each of four vertices of each of the plurality of subpixel electrodes is electrically connected to the corresponding connection electrode via the contact hole.

13. The liquid crystal display device according to claim 8,
wherein one or more connection electrodes are provided, the common electrode and each of the one or more connection electrodes facing each other over an entire gap portion between two subpixel electrodes, among the plurality of subpixel electrodes, that are adjacent to each other.

14. The liquid crystal display device according to claim 13,
wherein the plurality of wiring electrodes is formed in a separate layer from the one or more connection electrodes, and
a voltage corresponding to a data signal is applied to one of K or fewer subpixel electrodes forming each of the plurality of pixels among the plurality of subpixel electrodes via the corresponding wiring electrode among the plurality of wiring electrodes.

15. The liquid crystal display device according to claim 13,
wherein the plurality of subpixel electrodes and the one or more connection electrodes are formed by a transparent conductive material.

16. The liquid crystal display device according to claim 8,
wherein one or more connection electrodes are provided, the common electrode and each of the one or more connection electrodes facing each other over an entire gap portion between two subpixel electrodes, among the plurality of subpixel electrodes, that are adjacent to each other, and over an entire gap portion between two of the plurality of pixels that are adjacent to each other.

17. The liquid crystal display device according to claim 8,
wherein, of K subpixel electrodes obtained by dividing pixel electrodes forming each of the plurality of pixels among the plurality of the subpixel electrodes, all subpixel electrodes comprising at least a portion included in the display region are provided on the first substrate.

18. The liquid crystal display device according to claim 8,
wherein, of K subpixel electrodes obtained by dividing pixel electrodes forming each of the plurality of pixels among the plurality of subpixel electrodes, only a subpixel electrode comprising a portion having an area greater than or equal to a predetermined area included in the display region is provided on the first substrate.

19. The liquid crystal display device according to claim 8,
wherein the first substrate further includes:
a plurality of pixel transistors having a one-to-one correspondence with a plurality of the plurality of pixels formed by the plurality of subpixel electrodes,
a drive circuit configured to drive the plurality of pixel transistors and provided in the frame region, and
a polarity switching circuit configured to switch, at a predetermined interval, a polarity of the voltage applied to the plurality of subpixel electrodes, the polarity switching circuit being provided in the frame region and including the plurality of pixel transistors, wherein:
each of the plurality of wiring electrodes is further configured to be connected to a respective one of the plurality of pixel transistors,
the drive circuit includes a shift register formed by a plurality of unit circuits connected in series,
the plurality of unit circuits outputs, as a plurality of timing signals, a plurality of output signals becoming sequentially active,
capturing of a plurality of data signals is performed based on the plurality of timing signals,
the drive circuit further includes M latch circuits for each one of the plurality of timing signals, where M is an integer of 2 or more,
the M latch circuits capture M data signals among the plurality of data signals based on corresponding timing signals among the plurality of timing signals, and output the captured M data signals,
the polarity switching circuit is formed by a plurality of polarity control units corresponding to the plurality of wiring electrodes, respectively,
each of the plurality of polarity control units includes a first pixel transistor and a second pixel transistor, an on/off state of the first pixel transistor and the second pixel transistor changing changes in a mutually inverted manner based on a data signal among the plurality of data signals output from a corresponding latch circuit among the M latch circuits,
a first voltage and a second voltage are applied to each of the plurality of polarity control units, a voltage level of the first voltage and the second voltage changing in a mutually inverted manner between a first level and a second level at the predetermined interval,
when the first pixel transistor is in an on state, the first voltage is applied to a corresponding subpixel electrode among the plurality of subpixel electrodes via the corresponding wiring electrode among the plurality of wiring electrodes, and
when the second pixel transistor is in an on state, the second voltage is applied to the corresponding subpixel electrode via the corresponding wiring electrode.

20. The liquid crystal display device according to claim 8,
wherein the display region has a circular shape.

* * * * *